United States Patent
Belloni et al.

(10) Patent No.: US 12,373,432 B2
(45) Date of Patent: Jul. 29, 2025

(54) UNNESTING OF JSON ARRAYS

(71) Applicant: SAP SE, Walldorf (DE)

(72) Inventors: Stefano Belloni, Mannheim (DE); Christian Bensberg, Heidelberg (DE); Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 18/064,214

(22) Filed: Dec. 9, 2022

(65) Prior Publication Data
US 2023/0401208 A1  Dec. 14, 2023

Related U.S. Application Data

(60) Provisional application No. 63/350,321, filed on Jun. 8, 2022.

(51) Int. Cl.
| | | |
|---|---|---|
| *G06F 16/00* | (2019.01) | |
| *G06F 16/21* | (2019.01) | |
| *G06F 16/2453* | (2019.01) | |
| *G06F 16/93* | (2019.01) | |

(52) U.S. Cl.
CPC ...... *G06F 16/24549* (2019.01); *G06F 16/213* (2019.01); *G06F 16/24537* (2019.01); *G06F 16/24542* (2019.01); *G06F 16/93* (2019.01)

(58) Field of Classification Search
None
See application file for complete search history.

(56) References Cited

U.S. PATENT DOCUMENTS

| | | |
|---|---|---|
| 9,589,019 B2 | 3/2017 | Clifford et al. |
| 11,416,465 B1 | 8/2022 | Anwar et al. |
| 2013/0124467 A1 | 5/2013 | Naidu et al. |
| 2013/0166568 A1 | 6/2013 | Binkert et al. |
| 2016/0034478 A1 | 2/2016 | Hernandez-Sherrington et al. |
| 2017/0300517 A1 | 10/2017 | Amirsoleymani et al. |

(Continued)

OTHER PUBLICATIONS

Botoeva, Elena. Ontology-based Data Access—Beyond Relational Sources. Aug. 2019. Intelligenza Artificiale, vol. 13. pp. 21-36.*

(Continued)

*Primary Examiner* — Tuankhanh D Phan
(74) *Attorney, Agent, or Firm* — Mintz, Levin, Cohn, Ferris, Glovsky and Popeo, P.C.

(57) ABSTRACT

A method may include receiving a query including at least one unnest operation to unnest a plurality of elements from one or more JavaScript Object Notation (JSON) arrays. The at least one unnest operation may unnest the plurality of elements by generating a table in which each row of the table is populated by one of the plurality of elements. An execution plan may be generated to include a pre-filter operation to filter, prior to the at least one unnest operation, the plurality of elements included in the one or more JSON arrays. For example, the pre-filter operation may be performed by iterating through the elements from the one or more JSON arrays to identify one or more elements satisfying a predicate included in a where clause of the query. The query may be executed in accordance with the execution plan. Related systems and computer program products are also provided.

20 Claims, 14 Drawing Sheets

(56) References Cited

U.S. PATENT DOCUMENTS

2017/0308555 A1* 10/2017 Hirzel ............... G06F 16/211
2021/0173621 A1*  6/2021 Fender ................ G06F 8/71

OTHER PUBLICATIONS

Abiteboul. S. et al., "Research Directions for Principles of Data Management," Dagstuhl Perspectives Workshop 16151, Dagstuhl Afanifestos 7, 1 (2018). 1-29.

Bray, T. et al., "The Javascript Object Notation (JSON) Data Interchange Format," (2014).

Chen, Y. et al., "A Study of SQL-on-Hadoop Systems," In BPOE LNCS, vol. 8807, Springer, 154-166.

Cole, R.L. et al., "The mixed workload CH-benCHmark," Proceedings of the Fourth International Workshop on Testing Database Systems. 2011.

Cooper, B.F. et al., "Benchmarking Cloud Serving Systems with YCSB," In SoCC. ACM, 143-154.

Deep, S. et al. "DIAMetrics: Benchmarking Query Engines at Scale." Proceedings of the VLDB Endowment 13.12.

Difallah, D.E. et al., "OLTP-Bench: An Extensible Testbed for Benchmarking Relational Databases," Proc. VLDB Endow 7, 4 (2013), 277-288.

Erling, O. et al., "The LDBC Social Network Benchmark: Interactive Workload," In SIGMOD. ACM. 619-630.

Gray, J. [Ed.] "Database and Transaction Processing Performance Handbook," In The Benchmark Handbook for Database and Transaction Systems (2nd Edition). Morgan Kaufmann.

Ingo, H. et al., "Automated System Performance Testing at MongoDB," In DBTest@SIGMOD. 3:1-3:6.

Jahangiri, S. "Wisconsin Benchmark Data Generator: To JSON and Beyond," In SIGMOD. ACM, 2887-2889.

Kamsky, A. "Adapting TPC-C Benchmark to Measure Performance of Multi-Document Transactions in MongoDB," Proc. VLDB Endow. 12, 12 (2019). 2254-2262.

Read, A.G. "DeWitt clauses: Can we protect purchasers without hurting Microsoft," Rev. Litig. 25 (2006). 387-421.

Rigger, M et al., "Testing Database Engines via Pivoted Query Synthesis," (2020), 667-682.

Ritter, D. et al., "Bench-marking integration pattern implementations," In DEBS. ACM, 125-136.

Seltenreich, A. et al., "SQLSmith," 2020. (Available at https://github.com/anse1/sqlsmith).

Vogelsgesang, A. et al., "Get Real: How Benchmarks Fail to Represent the Real World," Proceedings of the Workshop on Testing Database Systems. 2018.

Zhong, R. et al., "SQUIRREL: Testing Database Management Systems with Language Validity and Coverage Feedback," CCS'20: Proceedings of the 2020 ACM SIGSAC Conference on Computer and Communications Security. 2020.

* cited by examiner

UNNESTING OF JSON ARRAYS

CROSS REFERENCE TO RELATED APPLICATION

This application claims priority to U.S. Provisional Application No. 63/350,321, entitled "BENCHMARKING JSON DOCUMENT STORES" and filed on Jun. 15, 2022, the disclosure of which is incorporated herein by reference in its entirety.

TECHNICAL FIELD

The subject matter described herein relates generally to data processing and more specifically to techniques for unnesting JavaScript Object Notation (JSON) arrays.

BACKGROUND

JavaScript Object Notation (JSON) is an independent data exchange and storage format that has become a popular alternative to Extensible Markup Language (XML). JSON is a subset of the JavaScript programming language that uses two structures, an ordered list of values known as an array and a collection of name and value pairs known as an object, to represent a document. The growing popularity of JSON as exchange and storage format in various applications has led to its rapid and widespread dissemination. Timely storage and processing of JSON documents are therefore crucial for many organizations. Accordingly, specialized JSON document stores are deployed ubiquitously to support a gamut domain-specific workloads.

SUMMARY

Systems, methods, and articles of manufacture, including computer program products, are provided for unnesting JavaScript Object Notation (JSON) arrays. In one aspect, there is provided a system including at least one data processor and at least one memory. The at least one memory may store instructions that cause operations when executed by the at least one data processor. The operations may include: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

In another aspect, there is provided a method for unnesting JavaScript Object Notation (JSON) arrays. The method may include: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

In another aspect, there is provided a computer program product including a non-transitory computer readable medium storing instructions. The instructions may cause operations may executed by at least one data processor. The operations may include: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

In some variations of the methods, systems, and non-transitory computer readable media, one or more of the following features can optionally be included in any feasible combination.

In some variations, the at least one unnest operation may unnest the plurality of elements by at least generating a table in which each row of the table is populated by an element from the plurality of elements.

In some variations, each element of the plurality of elements may be associated with a path that includes one or more other elements of the plurality of elements that are traversed in order to reach the element.

In some variations, the at least one unnest operation may include a first unnest operation performed on a first array and a second unnest operation performed on a second array.

In some variations, the first unnest operation and the second unnest operation may form a sequential unnest operation based at least on the first unnest operation and the second unnest operation sharing a common sub-path with a common root element. The sequential unnest operation may include concatenating a first result of the first unnest operation and a second result of the second unnest operation.

In some variations, the first unnest operation and the second unnest operation form a Cartesian unnest operation based at least on the first unnest operation and the second unnest operation not sharing a common root element, and wherein the Cartesian unnest operation includes generating a Cartesian product of a first result of the first unnest operation and a second result of the second unnest operation.

In some variations, the at least one unnest operation may be performed without indexing the plurality of elements from the one or more JSON arrays.

In some variations, the executing of the query may include performing the pre-filter operation by at least iterating through the plurality of elements from the one or more JSON arrays to identify one or more elements satisfying a predicate included in a where clause of the query.

In some variations, the pre-filter operation may be performed to reduce the quantity of elements to be unnested when performing the at least one unnest operation.

In some variations, the plurality of data may include custom data and/or existing data associated with the one or more document stores.

In some variations, the query may be executed at a document store storing one or more JSON documents including the one or more JSON arrays.

In some variations, the document store may be a JSON document store and/or a relational database with a JSON extension.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to JavaScript Object Notation (JSON) arrays, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. When practical, similar reference numbers denote similar structures, features, or elements. In the drawings.

When practical, similar reference numbers denote similar structures, features, or elements.

DETAILED DESCRIPTION

Figure 1:
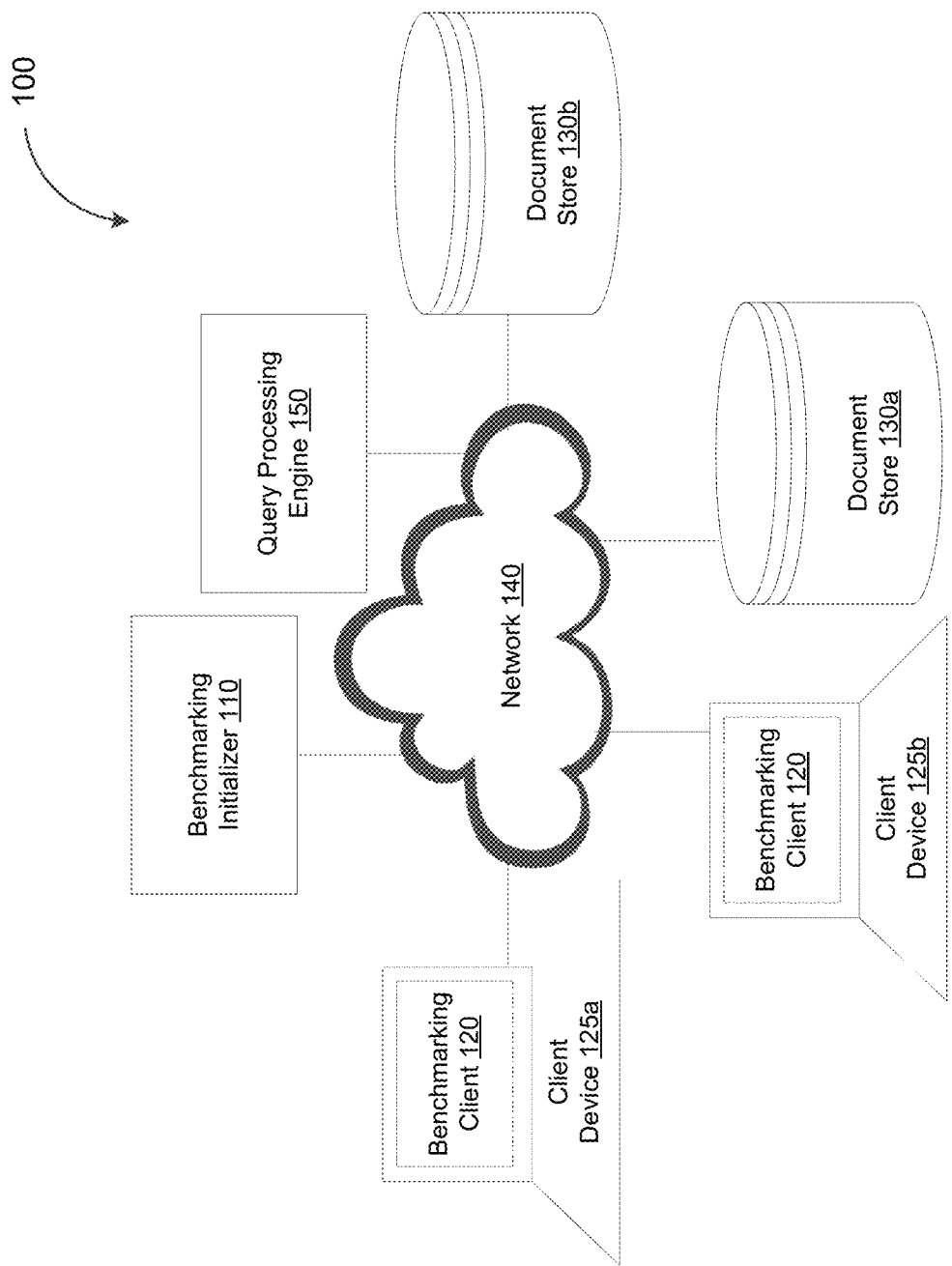
FIG. 1 depicts a system diagram illustrating an example of a benchmarking system, in accordance with some example embodiments.

In recent years, JavaScript Object Notation (JSON) and its variants gained popularity as data exchange and storage formats due to their flexible, semi-structured data representation. This is especially important for analytical data processing systems working on massive amounts and a wide variety of data. As a result, the popularity of JSON document stores and databases (e.g., Couchbase, MongoDB, OrientDB, and/or the like) grew rapidly. Even relational database vendors have started to invest in JSON support and extensions (e.g., PostgreSQL, SAP HANA, and/or the like). Despite the wide variety of JSON document stores, a JSON-specific benchmark for evaluating the performance of different JSON document stores remains absent. In particular, existing benchmarks for relational databases, key-value stores, and graph databases do not cover JSON-specific workloads and data including, for example, JSON arrays and nested objects. Efforts to extend these existing benchmarks to cover JSON-specific workloads and data support neither flexible data and query generation, which is necessary when evaluating domain-specific workloads, nor any custom queries and data.

In some example embodiments, a benchmarking platform may support an extensible, scalable JSON-specific benchmark called DeepBench that addresses the nested object and array data present in JSON documents. Various implementations of the JSON-specific benchmark disclosed herein may permit flexibly configurable domain-independent (e.g., varying document sizes, concurrent users, and query complexity), JSON-specific scale levels (e. g., object, array nesting) and workloads. While DeepBench follows standards for general benchmark conceptions (e.g., portability, scalability, simplicity), its modern, modular, and distributed benchmark architecture and JSON-specific scaling makes DeepBench relevant to document stores and requires coordinated data and query generation for potentially deeply nested JSON objects and arrays.

In some example embodiments, DeepBench may be optimized for JSON-specific workload (e.g., queries and data), scalability (including complexity of statements, data types, data, result sizes and users), and adaptability to custom workloads (e.g., queries and data and queries). In particular, DeepBench constitutes a scalable JSON document store benchmark with configurable, custom workloads as well as guided query and data generation. The resulting DeepBench prototype may be deployed to assess and compare JSON data and query-specific performance characteristics of various JSON document stores (e.g., MongoDB) as well as relational databases with JSON extension (e.g., PostgreSQL). For example, DeepBench may be applied to evaluate critical performance dimensions such as analytical query processing, JSON-specific workload and data for object nesting and array unnesting, and the impact of JSON-specific improvements. In addition to its versatility, DeepBench-based analysis is shown to provide insights into potential weaknesses that cannot be found with existing, non-JSON benchmarks. For instance, the weaknesses of existing document stores when it comes to JSON-specific array and analytical processing are identified by applying DeepBench.

In some example embodiments, DeepBench's coordinated data and query generation may be leveraged to explore JSON-specific queries and data. In particular, this exploration of JSON-specific queries and data includes an analysis of deeply nested JSON objects and arrays. A better understanding of nested object and array operations within JSON document stores was achieved through evaluating the mechanics of object path access and array unnesting. For example, the processing performance of JSON documents stores may be improved through adopting analytical processing techniques from relational databases. In particular, object nesting may be efficiently addressed by indexing while the efficiency of the UNNEST operation (e.g., to unnest arrays) may be improved by pre-filtering the underlying data.

FIG. 1 depicts a system diagram illustrating an example of a benchmarking system 100, in accordance with some example embodiments. Referring to FIG. 1, the benchmarking system 100 may include a benchmarking initializer 110, a benchmarking client 120 deployed at one or more client devices 125, and one or more document stores 130. As shown in FIG. 1, the client device 120 including the benchmarking client 110 and the one or more document stores 130 may be communicatively coupled over a network 140. The one or more client device 125 may be processor-based devices including, for example, a smartphone, a tablet computer, a wearable apparatus, a virtual assistant, an Internet-of-Things (IoT) appliance, and/or the like. The network 140 may be a wired network and/or a wireless network including, for example, a wide area network (WAN), a local area network (LAN), a virtual local area network (VLAN), a public land mobile network (PLMN), the Internet, and/or the like.

The one or more document stores 130 may be configured to store data (e.g., documents) in a JavaScript Object Notation (JSON) format. For example, the one or more document stores 130 may include JSON document stores (e.g., Couchbase, MongoDB, OrientDB, and/or the like) and/or relational databases with JSON extension (e.g., PostgreSQL, SAP HANA). As noted, the JSON format is a text-based, language-independent data interchange format. The JSON format can be recursively defined as follows (omitting formal definitions of STRING and NUMBER due to brevity):

TEXT-OBJECT. . . OBJECT
OBJECT-{STRING : VALUE, . . . , STRING : VALUE}
ARRAY-[VALUE, . . . , VALUE]
VALUE-OBJECT|ARRAY|STRING|NUMBER|TRUE|FALSE|NULL

A JSON text is a sequence of zero or more JSON objects or arrays. A JSON object is enclosed in braces (e.g., "{" and "}"), and contains a sequence of zero or more key-value pairs. A key-value pair is a field of an object, for which each key is followed by a single colon (e.g., ":") separating the key from its corresponding value. An array is an ordered collection of values, and is represented as brackets (e.g., "[" and "]") surrounding zero or more values, separated by commas. A value can be a string in quotes (e.g., " " "), a number, true or false, null, an object, or an array. In a JSON document, every element may be identified by its path (e.g., an ordered set of elements).

Table 1 below depicts an excerpt of the exchange format used for the initiation of a payment during a Single Euro Payments Area (SEPA) credit transfer in JavaScript Object Notation (JSON) (originally in Extensible Markup Language (XML)).

TABLE 1

| | |
|---|---|
| 1. | {"CstmrCdtTrfInitn": { |
| 2. | "GrpHdr": {"InitgPty_Nm": "SAP"}, |
| 3. | "CdtTrfTxInf": [ |
| 4. | {"CdtrAcct_IBAN": "DE21..10", "Amt": 54.14} |
| 5. | ]} } |

As shown in Table 1, the credit transfer is initiated by sending a document, starting with a JSON object (CstmrCdtTrfInitn) that contains a header (GrpHdr) as JSON object, shared across all SEPA transactions (e. g., with the initiating party's name (InitgPty_Nm)), and a nested JSON array (CdtTrfTxInf) with transaction information such as IBAN (CdtrAcct_IBAN) and amount (Amt). When stored in a document store (e. g., for later reference), this credit transfer initiation may be retrieved by the query shown in Table 2 below. JSON collections are treated like relational tables, thus allowing data in a JSON format to be queried using SQL queries (e.g., similar to OrientDB, IBM DB2, and/or the like). The example of the query shown in Table 2, for example, is a SQL query whose result includes the average amount of all transactions.

TABLE 2

SELECT AVG(unnested.amt) FROM pain001
UNNEST CstmrCdtTrfInitn.CdtTrfTxInf as unnested
WHERE CstmrCdtTrfInitn.GrpHdr.InitgPty_Nm = "SAP";

As noted, existing benchmarks for relational databases, key-value stores, and graph databases do not cover JSON-specific workloads and data (e.g., JSON arrays and nested objects) while efforts to extend these existing benchmarks to cover JSON-specific workloads and data remain inadequate. Table 3 below depicts a comparison of existing benchmarks and DeepBench. For example, recent extension of the Wisconsin benchmark by JSON data generation supports arrays and objects, as in UniBench, but neither allow for the automatic nesting of object and array data or the generation of fitting queries. TPC-benchmarks like TPC-C/H/DS denote the standard for benchmarking and support concurrent user and data size scaling but none of the TPC-benchmarks focuses on nested JSON data or supports custom configurations. UniBench is a multimodel benchmark that generates JSON data for predefined queries, and is therefore unable to support configurable statement complexity or type. UniBench also lacks the ability for concurrent user scaling. While data and result sizes can be configured and user scaling can be set up for YCSB, neither statement, type complexity nor JSON nesting is supported.

Contrastingly, the DeepBench benchmark supports scalability and adaptability mechanisms. In particular, DeepBench's definition focuses on domain-specific aspects for a coordinated generation of data and queries. Meanwhile queries are generated to ensure generation of matching data, thus providing the unprecedented ability to support domain-specific document store workloads (e.g., data and queries).

Figure 15:
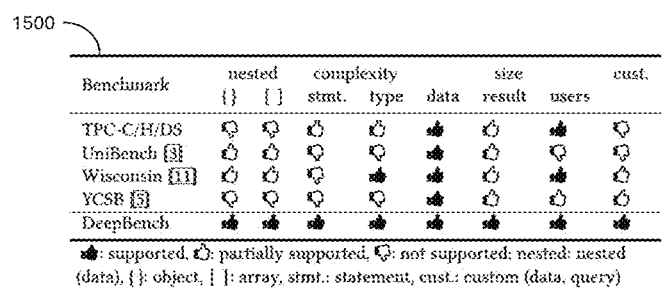
FIG. 15 depicts a table showing a comparison of DeepBench to existing benchmarks for relational databases, key-value stores, and graph databases.

FIG. 15 illustrates a table 1500 showing a comparison of DeepBench to existing benchmarks for relational databases, key-value stores, and graph databases.

Figure 2A:
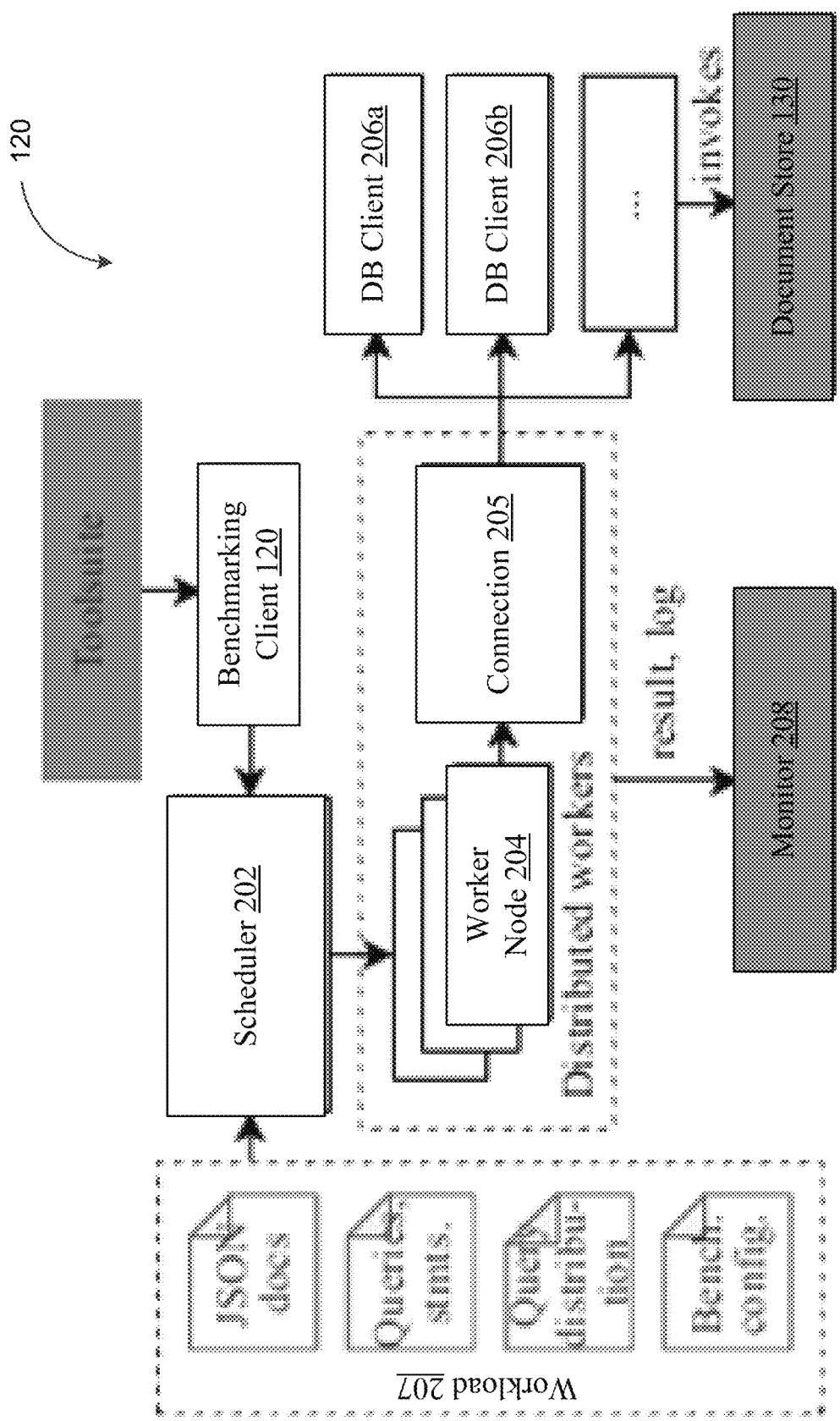
FIG. 2A depicts a block diagram illustrating an example of a benchmarking client, in accordance with some example embodiments.

Referring again to FIG. 1, the benchmarking system 100 may include the benchmarking client 120, which may be deployed at the one or more client devices 125. To further illustrate, FIG. 2A depicts a block diagram illustrating an example of the benchmarking client 120, in accordance with some example embodiments. As shown in FIG. 2A, in some example embodiments, the benchmarking client 120 may serve as a benchmark driver responsible for controlling one or more worker nodes 204 executing queries at the target system (e.g., the one or more document store 130). For instance, in the example shown in FIG. 2A, the worker nodes 204 may interface with one or more database clients 206, for example, via a connection 205. Moreover, each of the database clients 206 may, in response to triggers from the worker nodes 204, invoke the corresponding document stores 130. The workers nodes 204 may be distributed across multiple physical (virtual) machines to scale to the required number of concurrent users, and gather performance statistics, passed to a central monitor 208 for evaluation. The benchmarking client 120 may read user inputs, received from the one or more client devices 125 for example, specifying the parameters used in benchmark invocation and workload generation. Table 4 below depicts some examples of configuration parameters for read-only workloads such as a list of concurrent users (user_count) where each entry denotes the number of users used in a dedicated experiment.

TABLE 4

| 1 | {"run_query_bench": "true , |
| 2 | "user_counts": [1, 2, 4, 8, 16, 32, 64, 128]} |

When configured for insert, update, or mixed benchmarks, parameters such as batch sizes can also be specified. The worker nodes 204 may be started and configured by a scheduler 202. Moreover, the scheduler 202 may generate a workload 207 which then uses the QUERY DISTRIBUTION information to distribute the workload across the one or more worker nodes 204, for example, in a closed-loop fashion where every worker node 204 is allocated the same payload. The documents (e.g., JSON documents) and the queries (e.g., SQL statements) accessing the documents may originate from the benchmarking initializer 110 described in more detail below.

Figure 2B:
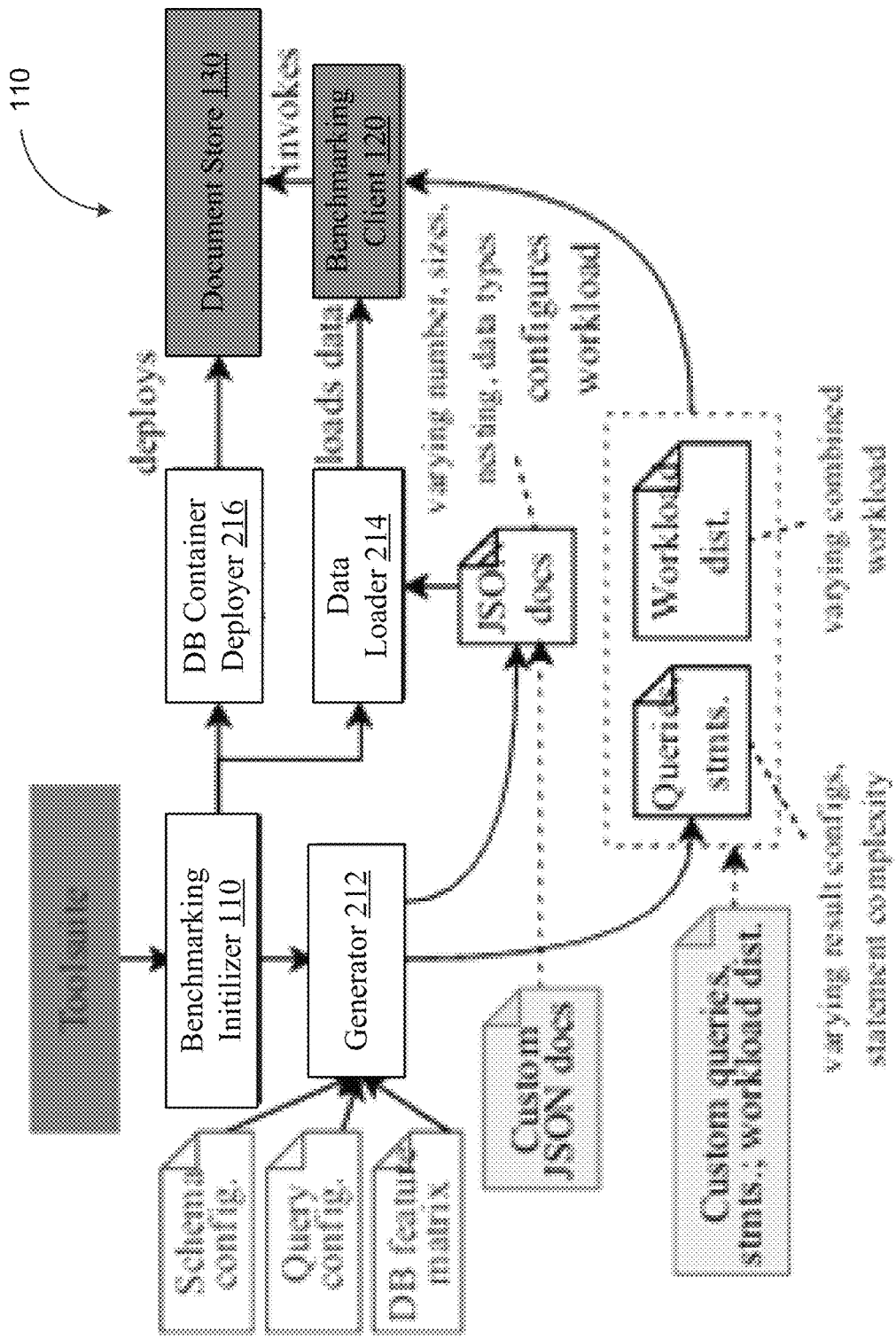
FIG. 2B depicts a block diagram illustrating an example of a benchmarking initializer, in accordance with some example embodiments.

FIG. 2B depicts a block diagram illustrating an example of the benchmarking initializer 110, in accordance with some example embodiments. In some example embodiments, the benchmarking initializer 110 may generate queries (e.g., SQL queries and/or the like) and fitting data in a coordinated way, deploy the one or more document stores 130 under test, load the generated workload 207 for reading, and write the workload 207 for reading by the one or more database clients 206. For the query generation, the generator 212 may require user-defined schema (SCHEMA CONFIG.) and query (QUERY CONFIG.) whereas data generation may be performed based on the schema configuration alone. During query generation, a feature matrix (test-based generation per document store 130) may guide the generation of queries towards SQL features supported constructs (e.g., DB FEATURE MATRIX), and can be further used to validate query candidates based on their fit for a certain document store 130.

Since the one or more document stores 130 may not always support SQL-like query language and statements but may rely on proprietary languages instead, the benchmarking initializer 110 may ingest custom queries and statements as libraries, which are then distributed to the worker nodes 204 and invoked during execution. Doing so may obviate generation for those document stores 130 that do not support SQL. Similarly, when available, custom JSON data (e.g., BI Benchmark) and/or workload characteristics can also be added. For those cases, the query generation may be fit to the existing data.

When benchmarking the one or more data stores 130, the generator 212 may be configured to generate a large quantity of data of having certain structures as well as a variety of queries that fits the data. To ensure a match between data and queries, the generator 212 may operate based on a list of rules including, for example, the presence of certain paths in the documents, the number of document with a particular value for an identifier, and/or the like. Moreover, the generator 212 may operate based on a list of optional attributes, which are used to expand the document or to produce complex queries. In particular, the schema configuration ingested by the generator 212 may include OBJECT FP—{FORCEDPATH:ARRAY} and OBJECT RP—{RANDOMPATHS: OBJECT}, wherein OBJECT FP describes the fixed part of a document (e.g., every element in the ARRAY in FORCEDPATH specifies the structure of the nested element that is required to appear in the generated data). For each forced path, the path to the required data element is specified as a list of keys (PATH) as well as its type (VALUETYPE). To control the result set of a query (NUM), it is possible to specify the number of documents that have a specific element equals to a defined value or the cardinality of an ARRAY. Alternatively, with OBJECT RP, random sub-documents may be generated to increase the size and complexity of a single document including, for example, the number of nested objects (OBJECT), the number of keys inside each object, and the size of the VALUE associated with each key.

Table 5 below depicts an example schema configuration for generating one million JSON documents like the one shown in Table 1. Notably, nonstandard JSON value types such as COMPANY and IBAN can be used to draw samples from a company name dictionary or generate structurally valid IBAN representations.

TABLE 5

| 1 | {"forcedPaths": |
| 2 | [{"path": ["CstmrCdtTrfInitn", "GrpHdr", "InitgPty_Nm"], "valueType": "company", "operator", "eq", "value": "SAP", "num": 3000 |
| 3 | }, "path": ["CstmrCdtTrfInitn", "CdtTrfTxInf[2]", " CdtrAcct_IBAN"], "valueType", "iban" |
| 4 | }, {"path": ["CstmrCdtTrfInitn", "CdtTrfTxInf[2]", "Amt"] , "valueType": "pyfloat(3, 3, True)" |
| 5 | }], "numSamples": 1000000} |

The generator 212 may also generate queries matching the generated data such as, for example, SQL queries that are consistent with the structure of the data. Accordingly, to generate queries, the generator may process the same schema configuration used for generating data, along with the query configuration and a feature matrix of the one or more data stores 130. The query configuration may include, for example, OBJECT P—{PROJECTION:ARRAY}, OBJECT W—{WHERECLAUSE:OBJECT}, and OBJECT U—{UNNEST:OBJECT}.

In some example embodiments, OBJECT P may be defined inside a JSON Object and may contain the name of the collection or table as COLLECTION (e.g., containing documents). Moreover, OBJECT P may describe the element used in a project-clause, which can only specify forced paths PATH elements that are in the schema generation's FORCEDPATHS. Additionally, randomly selected functions (e.g., SQL functions) from the feature matrix can be applied to the projected element (e.g., NUMBER_UNARY_FCT, NUMBER_AGGREGATE_FCT). Similarly, OBJECT W may describe a where-clause, which allows for conjunctive and disjunctive combination of multiple predicates for the selection. Appropriate filters can be specified as FORCEDPATHS or randomly selected by the generator 212 bound by the generated data. Finally, OBJECT U may describe the element (PATH) and the nesting depth (LEVELS) that has to be unnested or unwound. Table 6 below depicts an example query configuration used to generate queries matching the generate data such as the one shown in Table 2.

TABLE 6

| | |
|---|---|
| 1  | {"collection": "pain 001", |
| 2  | "number_of_different_queries": 3, |
| 3  | "combinations_per_query": 5, |
| 4  | "projection": { |
| 5  |   "forcedPaths": [ |
| 6  |     {"path": ["CstmrCdfTrfInitn", "GrpHdr", " InitgPty_Nm"]} |
| 7  |   ], "random": { |
| 8  |     "number_total": [0,5], "number_unary_fct": [1, 2], " number_aggregate_fct": [0,5] |
| 9  |   } |
| 10 | }, "where_clause": { |
| 11 |   "operators": ["AND", "OR"], "probability": 1, "random": { "number_total": [1,1] }, |
| 14 |   "forcedPaths": [ ] |
| 15 | }, "unnest" : { |
| 14 |   "probability": 0.8, |
| 15 |   "path": ["CstmrCdtTrfInitn", "CdtTrfTxInf[2]", " CdtrAcct_IBAN"], "levels": [1, 1] |
| 16 | }} |

The corresponding excerpt from the feature matrix is shown in Table 7 below. In this example, the feature matrix may specify that the unary average function (AVG(:1)) is only defined for numeric values.

TABLE 7

| | |
|---|---|
| 1 | {"AVG(:1)": "array": false, "Boolean": false, "null": false, "number": true, "object": false, "string": false}, ...} |

In some example embodiments, meaningful benchmark results may be obtained by the benchmarking initializer 110 performing "index guessing". That is, given a certain query configuration (e.g., including VALUES of type STRING or NUMBER), the benchmarking initializer 110 may be configured to automatically create single or compound indexes, for example, by evaluating used FORCEPATH, FILTERS, FUNCTIONS, data type of the filtered VALUES, and the expected result set configurations. The generated indexes may be overwritten based on user inputs specifying arbitrary indexes.

In some example embodiments, the benchmarking initializer 110 may provide matching JSON-specific queries and data, for example, by specifying configurable entities relevant to the generation of data as well as the corresponding queries. Important scale factors like query and data complexity, data types, number of documents, result set sizes as well as object and array nesting levels are adjustable to the specific use case. Additionally, the benchmarking client 120 is able to distribute its worker nodes 204 to run distributed machines to flexibly scale the number of concurrent users. The benchmarking initializer 110 also supports SQL (dialect) query generation to support several existing document stores. In cases where the document store being tested does not support SQL or a dialect, or if certain use cases are associated with existing queries and/or data, those queries may be executed by using the benchmarking initializer 110 as a workload runner, or in a mixed-mode with at least some generated queries and/or data provided by the benchmarking initializer 110. The benchmarking initializer 110 may be configured to support the mixed operation mode.

In some example embodiments, a DeepBench prototype including the benchmarking initializer 110 and the benchmarking client 120 may be deployed to evaluate the impact of JSON-specific workloads on the performance of the JSON document store MongoDB and that of PostgreSQL/JSON, which is a JSON-enabled relational database. The evaluation may focus on querying nested elements of documents (e.g., object, array), which includes comparing the performances of MongoDB and PostgreSQL/JSON to that of an anonymous SystemX capable of handling JSON documents. The evaluation also focuses on exploring the extensibility of DeepBench for existing, analytical queries and matching data from one workbook of BI Benchmark, and the execution of proprietary query languages like the one from MongoDB.

The first part of the evaluation includes experiments that target read access of JSON objects at different nesting levels as well as number of concurrent users. In this case, the generated JSON document collection includes of 5 million documents of the following self-similar structure: OBJECT K—{STRING: RNDVALUE, STRING: OBJECT K+1} and RNDVALUE—RANDOM NUMBER|RANDOM TEXT. Here, each document may be associated with a maximum depth of k=16, while the corresponding queries project a key from the first level before apply a filter (e.g., equality) for elements at a specific level (e.g., levels 1, 2, 4, 8, 16). The number of concurrent users was scaled from one up to 100. The query selectivity is configured for small (e.g., returning 100 documents) and large sizes (e.g., 50 k documents) in order to evaluate the impact of indexes on the running times.

Table 8 below depicts an example of a query generated by the generator 212 for evaluating the querying of nested JSON objects.

TABLE 8

| Experiment | MongoDB | Postgres |
|---|---|---|
| ... | | |
| nesting level 16, small result set | db.deepbench.find( 'l1.l2.l3.l4.l5.l6.l7.l8.l9. l10.l11.l12.l13.l14.l15. l16.name' : 'Bobby Fisherman'}, {'_id': 0, 'name': 1, 'age': 1}) | SELECT _JDATA_->>'name' _JDATA_->>'age' FROM "deepbench" WHERE _JDATA_->'l1'->'l2'-> 'l3'->'l4'->'l5'->'l6'-> 'l7'->'l8'->'l9'->'l10'-> 'l11'->'l12'->'l13'-> 'l14'->'l15'-> 'l6'->>'name') = 'Bobby Fisherman' |

Figure 3:
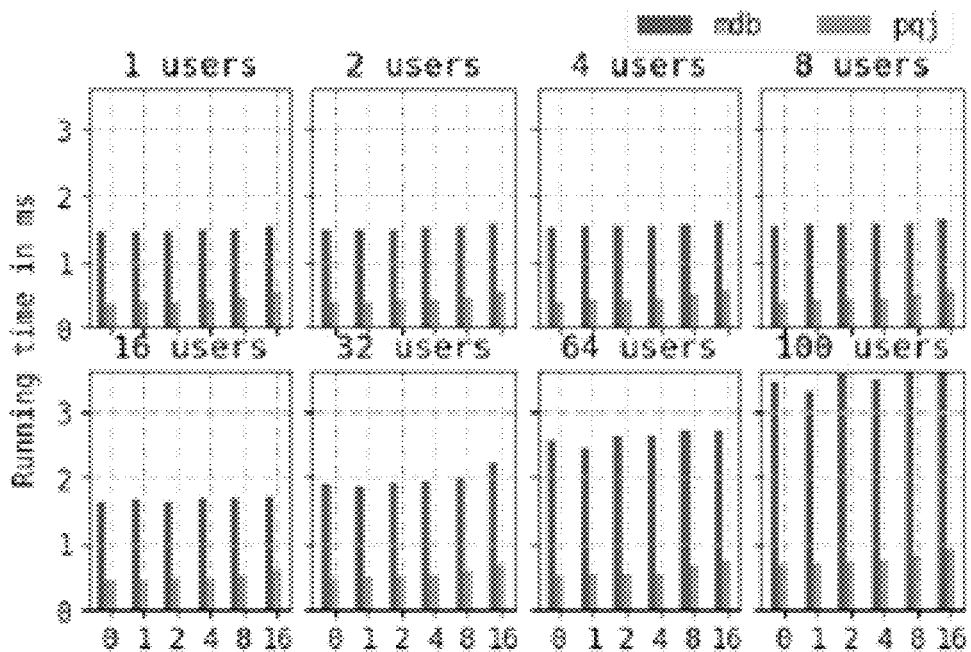
FIG. 3 depicts graphs illustrating the runtimes of queries for documents with varying nesting levels and quantity of users with an index, in accordance with some example embodiments.
Figure 4:
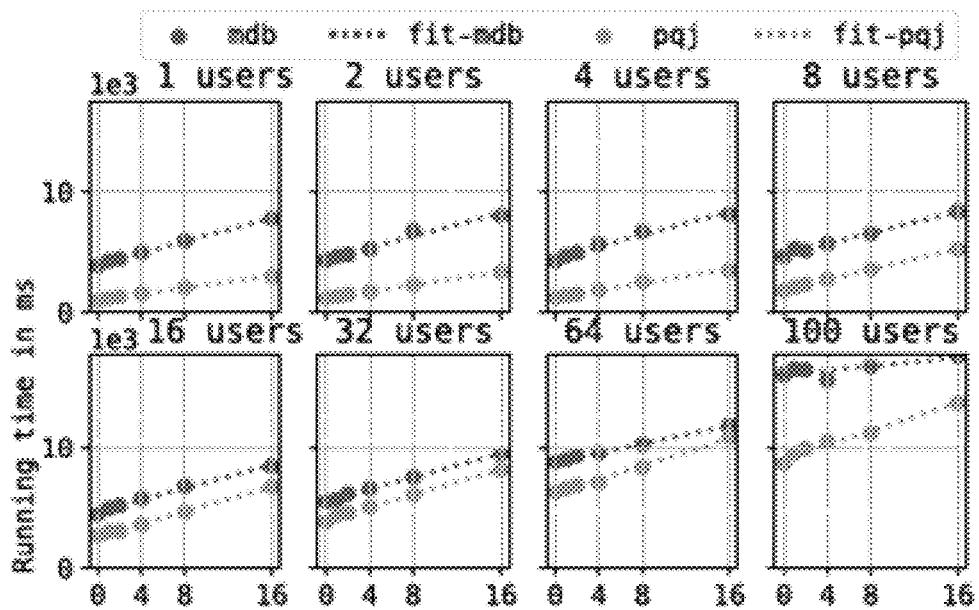
FIG. 4 depicts graphs illustrating the runtimes of queries for documents with varying nesting levels and quantity of users without an index, in accordance with some example embodiments.
Figure 5:
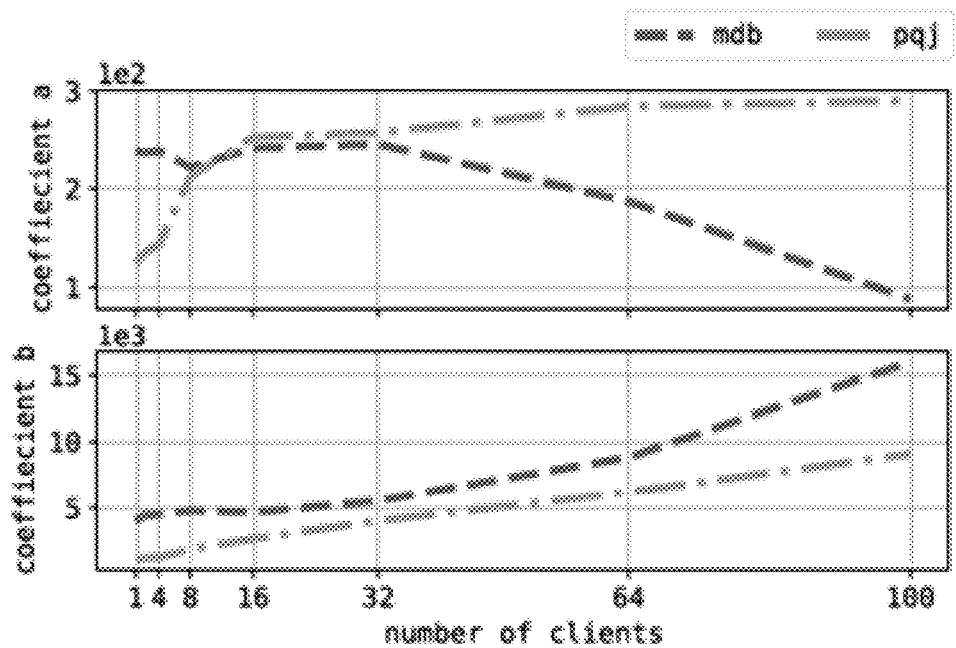
FIG. 5 depicts graphs illustrating the impact of the quantity of concurrent users has on query runtime, in accordance with some example embodiments.

FIG. 3 shows the runtimes of queries for documents with varying nesting levels and number of concurrent users with an index. As shown, the presence of an index renders the depth of the object access mostly irrelevant when it comes to access time. While the runtime of PostgreSQL remains stable for increasing numbers of concurrent users, the impact of multiple clients on MongoDB is greater than that of nested object access. For queries without an index, which then requires a full scan of the documents, the impact of the depth of document access is significant. FIG. 4 shows the results supported by a fitted, linear regression (y=ax+b), where coefficient b captures the impact of concurrent users. FIG. 5 shows an increase in runtime for up to 64 concurrent users, with the performance of MongoDB degrading disproportionately for 100 concurrent users, likely due to MongoDB having a less efficient memory management strategy compared to PostgreSQL. Coefficient a measures the relative impact of nested document access, which serves a progressively marginal role for MongoDB. Based on these results, the depth dimension of document object access can indeed have a significant and negative impact on the performance of each document store. However, this performance degradation may become more and more negligible with an increase in the quantity of concurrent users and may even be completely eliminated when an index is used.

The second part of the evaluation includes experiments targeting the transposition of arrays, which is also called unnesting or unwinding in MongoDB. This operation can become very expensive performance-wise due to the calculation of a Cartesian product, which is necessary when unnesting an object at level n, thus implying unnesting all the arrays at level m<n. For these experiments, the generated JSON collection includes 10 k documents of the following self-similar structure OBJECT K—{STRING:RNDVALUE,STRING: ARRAY K+1}, ARRAY K—[OBJECT K+1, Object K+1], and RNDVALUE—RANDOM NUMBER|RANDOM TEXT. In this case, each document may be associated with a maximum depth of 8 while the corresponding queries may unnest arrays at specific level (e.g., levels 1, 2, 4, 8), apply a filter on this element (e.g., equality to a numeric value), and project the element (along a key from the first level) to generate a result set containing 500 documents. Table 9 below depicts an example of the query generated by the generator 212 for querying nested JSON arrays. It should be appreciated that indexes were omitted from these experiments because the indexing of array elements is not a common feature in document stores.

TABLE 9

| Experiment | MongoDB | Postgres |
|---|---|---|
| ... | | |
| unnesting level 8 with filter | db.mycol.aggregate( [ {"$unwind": "$a1"}, {"$unwind": "$a1.a2"}, {"$unwind": "$a1.a2.a3"}, {"$unwind": "$a1.a2.a3.a4"}, {"$unwind": "$a1.a2.a3.a4.a5"}, {"$unwind": "$a1.a2.a3.a4.a5.a6.a7"}, {"$unwind": "$a1.a2.a3.a4.a5.a6.a7.a8"}, {"$match: { "$a1.a2.a3.a4.a5.a6.a7.a8.id": 956 }, }, { "project": { "_id": 0,, "customerid": 1, "a1.a2.a3.a4.a5.a6.a7.a8.id": 1, } } ]) | SELECT mycol._jdata_->'customerid', t->>'id' as id FROM "mycol", jsonb_array_elements( mycol._jdata_->'a1') as t1 jsonb_array_elements(t1->'a2') as t2, jsonb_array_elements(t2->'a3') as t3, jsonb_array_elements(t3->'a4') as t4, jsonb_array_elements(t4->'a5') as t5, jsonb_array_elements(t5->'a6') as t6, jsonb_array_elements(t6->'a7') as t7, jsonb_array_elements(t7->'a8') as t, WHERE CAST(t->>'id' AS BIGINT) = 956 |

Figure 6:
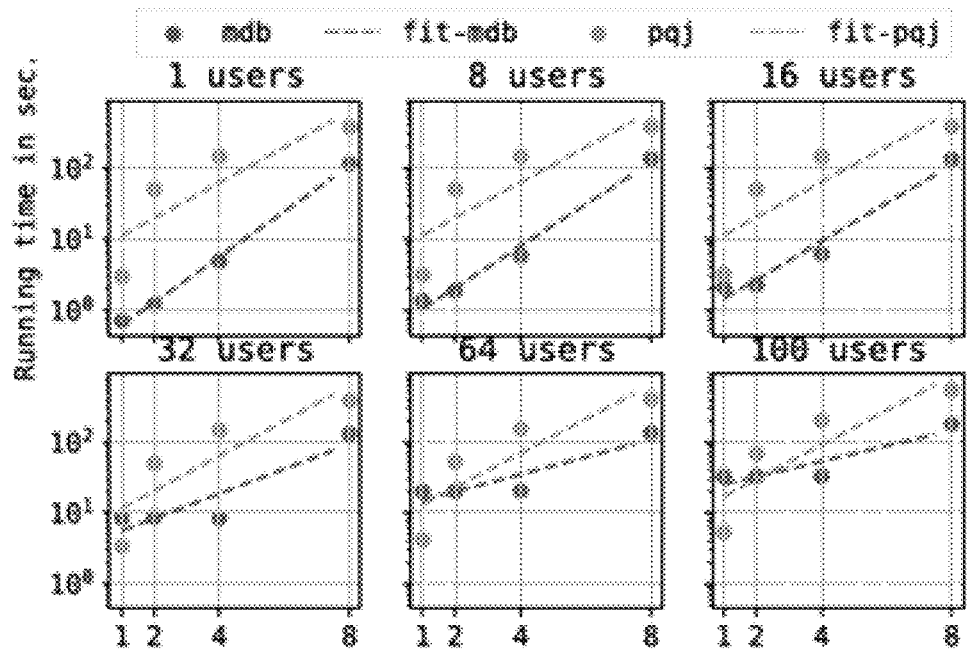
FIG. 6 depicts graphs illustrating the performance impact of unnesting with increasing nesting level, in accordance with some example embodiments.
Figure 7:
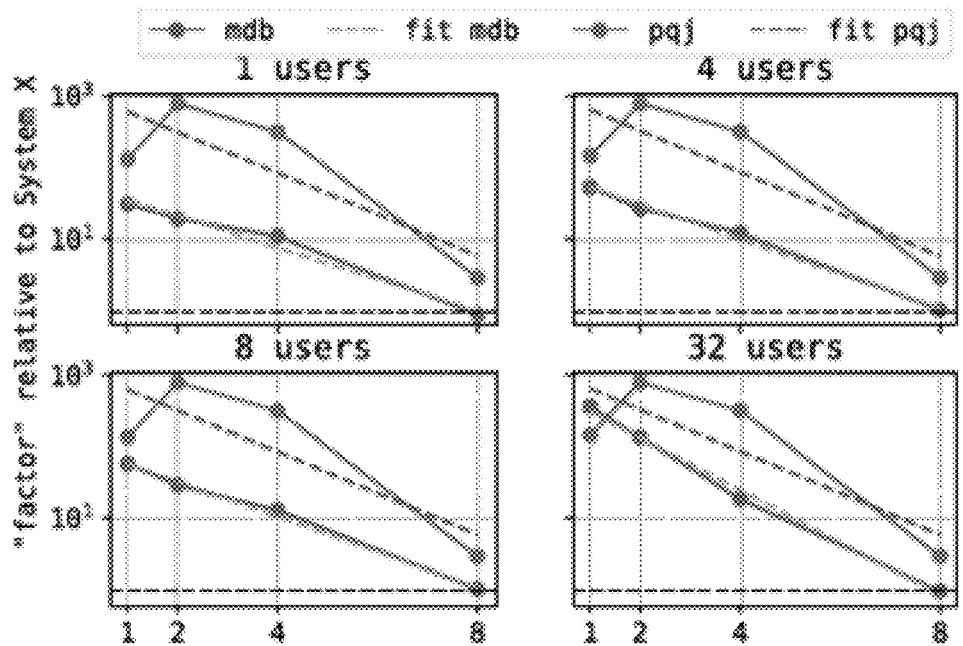
FIG. 7 depicts graphs illustrating the performance improvements achieved through avoiding unnecessary nesting, in accordance with some example embodiments.

FIG. 6 shows the significant effect that unnesting with increasing nesting level has on the performance of document stores. Although an exponential fitting does not completely approximate the measurements, it does capture the trend that is present in the different runs. In particular, SystemX performs quite well in such experiments at least because SystemX avoids unnecessary unnesting, for example, by filtering out irrelevant documents before performing an unnest. As shown in FIG. 7, by avoiding unnecessary nesting, SystemX is associated with a considerable speedup in all cases, when compared to PostgreSQL and MongoDB. Nevertheless, the relative performance gain decreases with an increasing nesting level, with Postgres performing similarly to MongoDB. Accordingly, it should be appreciated that unnesting deeply nested arrays is a complex problem that shows a near exponential performance degradation for increasing nesting level due to the high computational complexity of a similar array transposition problem. Optimizations, such as avoiding unnecessary unnesting, tend to improve runtimes.

Although a lot of data is transferred and stored as JSON documents, document stores are generally not known for high performance analytical query processing, especially when compared to column stores. Accordingly, the third part of the evaluation includes experiments focusing on reproducing and extending existing workloads, thus demonstrating the extensibility of DeepBench when generated JSON documents are mixed with a user-defined, analytical query from the BI Benchmark and one custom aggregation. For these experiments, the generator 212 generated a JSON collection with approximately five million documents with the structure shown in Table 10.

TABLE 10

| 1 | {"Number_of_Records": 1, "activity_sec": 20, |
| 2 | "application": "Blogger", "device": "6681", |
| 3 | "volume_total_bytes": 7604, "subscribers": 3 }. |

The first of the two queries used in the experiments, which are shown in Table 11 below, were taken from the BI Benchmark's Food workbook and groups all possible devices found in the collection (e.g., 3346 different values) before grouping them by device in an ascending order. The second query is a custom query calculating the average of the volume_total_bytes for a filtered (equality) subset of documents (e.g., 300,000). DeepBench automatically generated hash indexes on the key used in the where clause and studied the running times.

TABLE 11

| Experiment | MongoDB | Postgres |
|---|---|---|
| Food workbook: 1.sql | db.Food_1.aggregate([ {"$group": {"_id": "$device"}}, {"$sort":{"device": 1}} ]) | SELECT AVG( CAST("Food_1"._jdata_- >.>'volume_total_bytes' AS DOUBLE)) FROM "Food_1" WHERE CAST("Food_1"._jdata_->>'activity_sec' AS BIGINT) = 2 0.; |
| Food workbook: custom query | db.Food_1.aggregate([ {"$match": {"activity_sec": 20}}, {"$group": { "_id": 0, "average": "$avg": "$volume_total _bytes"}} ]) | SELECT "Food_1"._jdata_->>'device" AS "device' FROM "Food_1" GROUP BY "Food_1"._jdata_->>'device_ ORDER BY "device" ASC ; |

Figure 8:
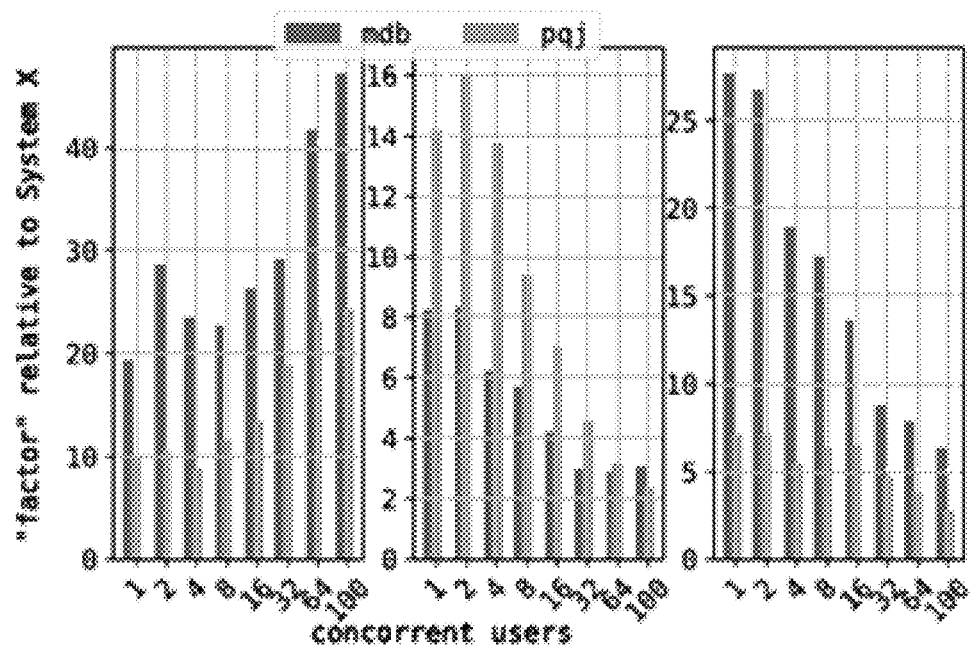
FIG. 8 depicts graphs illustrating the runtime factor for various JavaScript Object Notation (JSON) document stores, in accordance with some example embodiments.

FIG. 8 shows the runtime factor of MongoDB and PostgreSQL relative to SystemX. The combined grouping and ordering on the complete collection without index (left graph in FIG. 8) shows that MongoDB and PostgreSQL exhibit an increasing runtime factor compared to SystemX for a growing number of concurrent users. Although PostgreSQL performs better than MongoDB roughly by a factor of two, both are 10-45× slower than SystemX.

Similarly, for calculating the average on the filtered collection without an index (right graph in FIG. 8), PostgreSQL performs 2-5× better than MongoDB. However, when running the same query with an index (center graph in FIG. 8), MongoDB performs better than PostgreSQL by similar factors. Nevertheless, in either case, the performance degrades with an increasing number of concurrent users, with PostgreSQL performing slightly better than MongoDB for 100 concurrent users with indexed data possibly due to the more efficient memory management strategy noted earlier. As in the previous experiment on the Food workbook, SystemX performs 2-15× better with an index and 2-27× better without an index. Notably, for the AVG query, MongoDB and PostgreSQL performs better than SystemX when more concurrent users are present.

The strong performance of SystemX may be attributable to optimizations found in relational, column-oriented databases such as efficient, distributed grouping, and/or the like. Accordingly, performance improvement in document stores, particularly in the context of analytical query processing, may be achieved through improvements like indexing and analytical processing techniques from column stores. For example, the results from the querying of nested JSON structures show potential for improvements, such as avoiding unnecessary unnesting and result caching, when it comes the unnesting of JSON arrays. For nested JSON objects, scalability for concurrent users remains a dominant factor in the performance of document stores and for which more efficient memory management could be a possible improvement. In the context of analytical queries, indexing has the potential for improving the performance of aggregations like ORDER BY and AVG. More specific improvements found in current analytical processing in relational databases are also possible. Alternatively, on a system level, MongoDB can be configured for certain workloads using its workload isolation feature.

Figure 9:
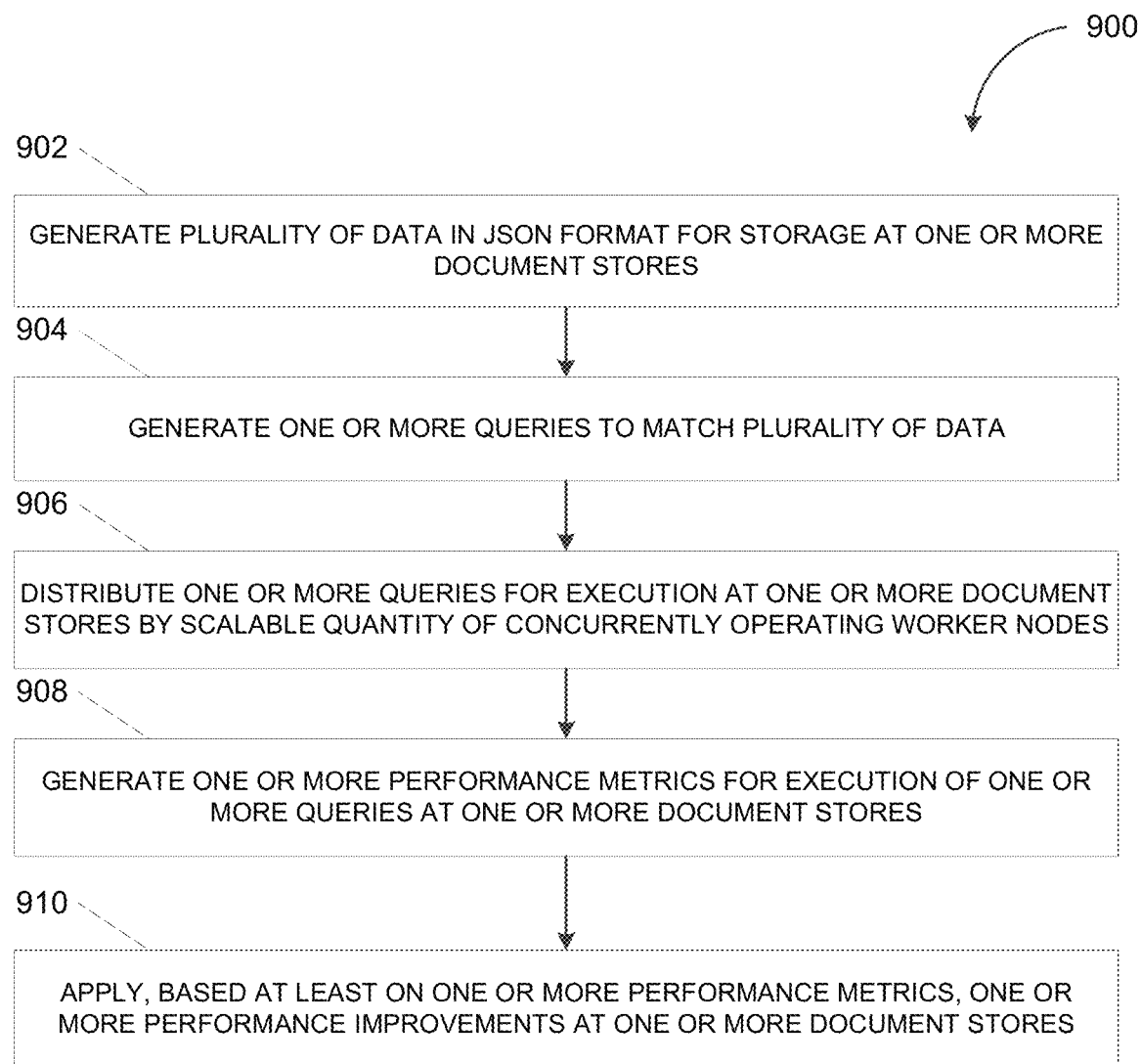
FIG. 9 depicts a flowchart illustrating an example of a process for benchmarking a JavaScript Object Notation (JSON) document store, in accordance with some example embodiments.

FIG. 9 depicts a flowchart illustrating an example of a process 900 for benchmarking a document store, in accordance with some example embodiments. Referring to FIGS. 1-9, the process 900 may be performed by the benchmarking system 100 including, for example, the benchmarking initializer 110 and the benchmarking client 120, to evaluate the performance of the one or more document stores 130. The document stores 130 may include JSON document stores such as Couchbase, MongoDB, OrientDB, and/or the like. Alternatively and/or additionally, the document stores 130 may include JSON-enabled relational databases (e.g., relational databases with JSON extensions) such as PostgreSQL, SAP HANA, and/or the like.

At 902, a plurality of data in a JavaScript Object Notation (JSON) format may be generated for storage at one or more document stores. In some example embodiments, the benchmarking initializer 110 may generate, based at least on a schema configuration of the one or more document stores 130, data in a JSON format for storage at the one or more document stores 130. The schema configuration may include, for example, OBJECT FP—{FORCEDPATH:ARRAY} and OBJECT RP—{RANDOMPATHS:OBJECT}, wherein OBJECT FP describes the fixed part of a document (e.g., every element in the ARRAY in FORCEDPATH specifies the structure of the nested element that is required to appear in the generated data). For each forced path, the path to the required data element may be specified as a list of keys (PATH) and a corresponding type (VALUETYPE). The generator 212 may generate the data to include a specific quantity of documents having an element that equals a defined value or the cardinality of an ARRAY, thus controlling the result set of a query (NUM). Alternatively, with OBJECT RP, the generator 212 may also generate random sub-documents in order to increase the size and complexity of a single document. These random sub-documents may include, for example, variations in the quantity of nested objects (OBJECT), the quantity of keys inside each object, the size of the VALUE associated with each key, and/or the like.

At 904, one or more queries may be generated to match the plurality of data. In some example embodiments, the generator 212 may also generate, based on the schema configuration, a query configuration, and a feature matrix of the one or more document stores 130, one or more queries matching the data generated in operation 902. For example, the generator 212 may generate one or more SQL queries that are consistent with the structure of the JSON data generated for storage at the one or more document stores 130. The query configuration may include, for example, OBJECT P—{PROJECTION:ARRAY}, OBJECT W—{WHERECLAUSE:OBJECT}, and OBJECT U—{UNNEST:OBJECT}, wherein OBJECT P is defined inside a JSON Object and may contain the name of the collection or table as COLLECTION (e.g., containing documents). Furthermore, OBJECT P may describe the element used in a project-clause, which can only specify forced paths PATH elements that are in the schema generation's FORCEDPATHS. Randomly selected functions (e.g., SQL functions) from the feature matrix can be applied to the projected element (e.g., NUMBER_UNARY_FCT, NUMBER_AGGREGATE_FCT). Similarly, OBJECT W may describe a where-clause, which allows for conjunctive and disjunctive combination of multiple predicates for the selection. Appropriate filters can be specified as FORCEDPATHS or randomly selected by the generator 212 based, for example, by the generated data. Finally, OBJECT U may describe the element (PATH) and the nesting depth (LEVELS) that has to be unnested or unwound.

At 906, the one or more queries may be distributed for execution at the one or more document stores by a scalable quantity of concurrently operating worker nodes. In some example embodiments, the one or more queries may be distributed to the benchmarking client 120 deployed at one or more client devices 125. In some cases, the benchmarking client 120 may read user inputs, received from the one or more client devices 125 for example, specifying the parameters used in benchmark invocation and workload generation. The benchmarking client 120 may control the one or more worker nodes 204 executing queries at the target system (e.g., the one or more document store 130). In particular, the workers nodes 204 may be distributed across multiple physical (virtual) machines to scale to the required number of concurrent users.

At 908, one or more performance metrics are generated for the execution of the one or more queries at the one or more document stores. In some example embodiments, the one or more worker nodes 204 associated with the benchmarking client 120 may gather, from the one or more document stores 130, performance statistics. These performance metrics may be passed to the monitor 208 for evaluation. In some cases, the performance metrics may include performance metrics for the one or more document stores 130 operating on different JSON-specific workloads and data including, for example, JSON arrays and nested objects. The JSON-specific workloads and data may include custom workloads including, for example, custom data and/or custom queries. Moreover, in some cases, the performance metrics may include performance metrics for the one or more document stores 130 operating with different quantities of concurrent users (e.g., scaled by varying the number of the worker nodes 204).

At 910, applying, based at least on the one or more performance metrics, one or more performance improvements at the one or more document stores. In some example embodiments, the performance of the one or more document stores 130 operating on data having a JSON format may be improved based on insights gained from the performance metrics gathered by the benchmarking client 120. For example, in the context of analytical query processing, performance improvements, such as lowering query runtimes and scaling to a large number of concurrent users, may be achieved through indexing and adopting analytical processing techniques from column stores. The performance associated with querying JSON structures may be improved, for example, by avoiding unnecessary unnesting and result caching.

As noted, in some example embodiments, DeepBench may be applied to evaluate critical performance dimensions such as analytical query processing, JSON-specific workload and data for object nesting and array unnesting, and the impact of JSON-specific improvements. In particular, DeepBench's coordinated data and query generation may be leveraged to explore JSON-specific queries and data, including an analysis of deeply nested JSON objects and arrays. In some example embodiments, a compact notation is introduced to define object and array nesting, which is then used to illustrate the complexity associated with unnesting arrays and the corresponding improvements to the existing UNNEST operation.

As noted earlier, every element in a JSON document may be identified by an ordered sequence of identifiers (or array access), which is traversed in order to reach any particular element in the JSON document starting from the document's root element. This ordered sequence of identifiers to reach an element in a JSON document is called a path. The example paths described herein follow the dot-notation of MongoDB but it should be appreciated that path notations are vendor-specific (e.g., -> in PostgreSQL/JSON). The element identified by x is x↦v, while vectors are denoted as $\vec{v}$. Furthermore, the concatenation of two paths x and y may be denoted as z=x·y. In some cases, a path x may be considered a sub-path of y if there exists a path t that forms the path y by being concatenated with the path x (e.g., y=x·t ... )

Figure 10:
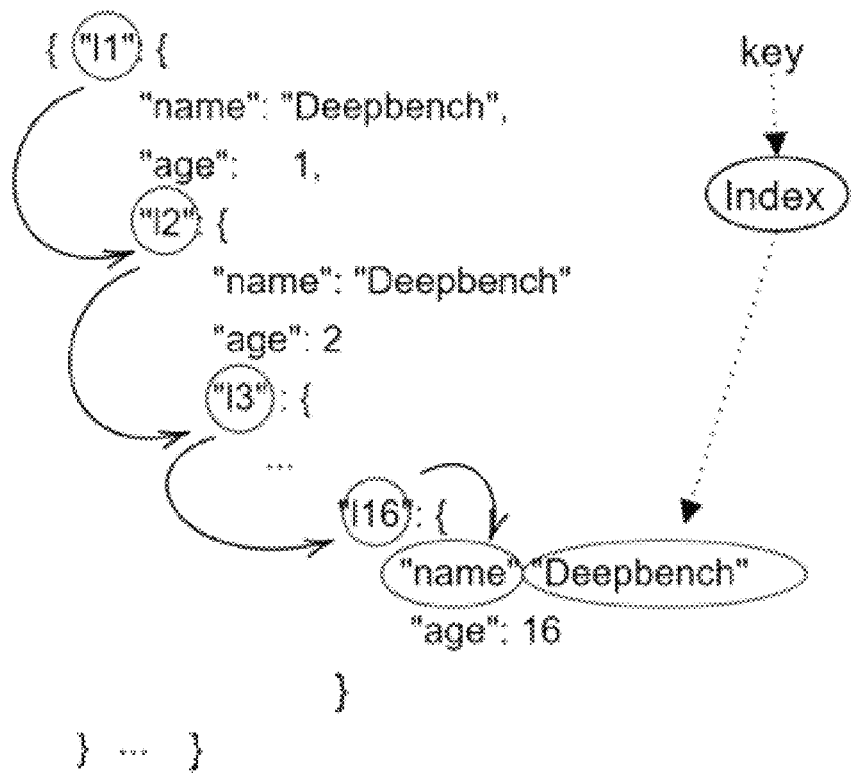
FIG. 10 depicts a schematic diagram illustrating examples of different access strategies for resolving a single path traversing a JavaScript Object Notation (JSON) document, in accordance with some example embodiments.

When no schema is imposed on a JSON document, there might not be a path pointing to a defined element in every case. FIG. 10 depicts examples of two different access strategies to resolve a single path p="l1"."l2"."l3" ... "l6". The first access strategy is to iterate though the nested documents while the second access strategy relies on data-structures, such as indexes, to accelerate the lookup.

Figure 11:
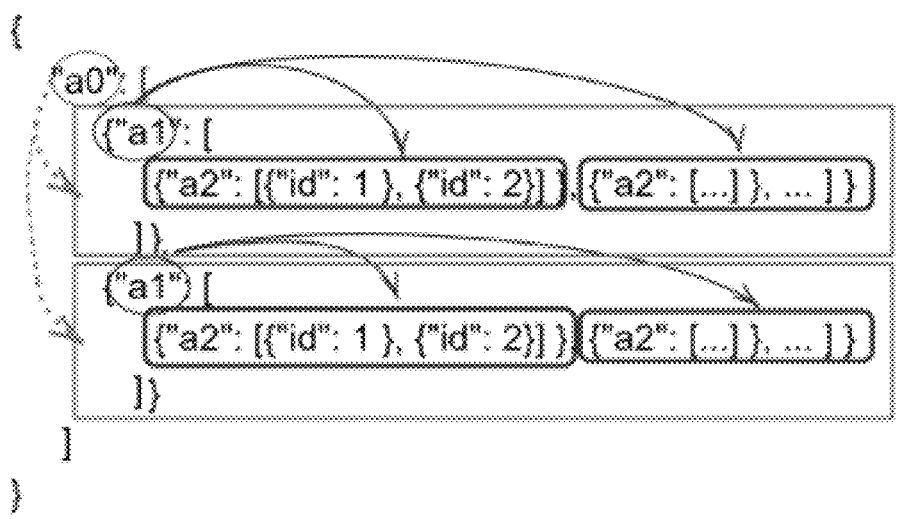
FIG. 11 depicts a schematic diagram illustrating the unnesting of an example of a JavaScript Object Notation (JSON) array, in accordance with some example embodiments.

Arrays within a JSON document may be heterogeneous with respect to the type of constituent elements. The transposition of such a vector of elements, called an UNNEST operation in SQL, is a function that takes a JSON array and returns a table with a row for each element in the array, and could be applied to JSON objects. FIG. 11 depicts a schematic diagram illustrating the unnesting of a homogenous array {"a":[1,5,−4,0]}. Unnesting the array at position "a" with the alias "t" will produce the following result set t with all elements from a.

| "t" |
| --- |
| 1 |
| 5 |
| −4 |
| 0 |

When multiple UNNEST operations are composed, the result may depend on the path to the unnested elements. In the case of a sequential UNNEST in which two UNNEST operations share a common sub-path, each array may be unnested separately and the results are concatenated. For example, consider a JSON document containing the array {"b":[{"a":[1,2]},{"a":[3,4]}]} with a common root element b. In a sequential UNNEST starting from the common root element b with the alias t and successively unnesting the concatenation "t"."a" as m will yield the concatenation of the single result shown below.

| "t" | "m" |
| --- | --- |
| {"a": [1, 2]} | 1 |
| {"a": [1, 2]} | 2 |
| {"a": [3, 4]} | 3 |
| {"a": [3, 4]} | 4 |

Contrastingly, when two UNNEST operations do not share a common root element, a Cartesian UNNEST operation may be performed in which the result corresponds to the Cartesian product of the independent UNNEST operations. For example, consider a JSON document including the array {"a":[1,2],"b":[3,4]}, which lacks a common root element. Accordingly, "a" may be unnested as "t1" and "b" may be unnested as "t2" the yield the following result set.

| "t1" | "t2" |
| --- | --- |
| 1 | 3 |
| 1 | 4 |
| 2 | 3 |
| 2 | 4 |

The complexity of an UNNEST operation is apparent in even the elementary examples shown above. As shown in FIG. 11, the traversal of array elements in the case of a sequential UNNEST operation starts at "a0" and continues along "a1". When performed naïvely through recursion, a large quantity of intermediate results may require materialization.

In some example embodiments, the computational efficiency and performance of an UNNEST operation may be improved by pre-filtering the underlying data. The array elements are not indexed at least because databases, such as the one or more document stores 130, typically do not support indexing and the creation of the index would require the performance of an UNNEST operation. A formal description of the UNNEST operation is provided using, for example, the notation $\pi_x$ for a projection, σ for a generalized selection, and new symbols for UNNEST and composition of operations. A composition, denoted as |, may be similar to the pipe operator in UNIX, with the composition $f(x)|g(x)$ being equivalent to $f(g(x))$. For example, the query SELECT "x" FROM "collection" WHERE "x"=0; may be rewritten as $\sigma_{x=0}|\pi_x$. Subsequent discussions are based on the following Post-greSQL query to access a JSONB datatype created by CREATE TABLE "deepbench" (_jdata_JSONB):

```
SELECT _jdata_->'id', t->>'id'
FROM "deepbench",
json_array_elements (_jdata_->'a1')
AS t1,
json_array_elements (t1-> 'a2')
AS t
WHERE CAST (t->> 'id' AS BINGINT) = 956;
```

Since such practical notations from PostgreSQL or MongoDB can become quite verbose and are vendor-specific, jsonb_array_elements(x) may be more generally written as t and the notation unnest(x, t) may be used instead. For paths in a document the - operator may be used instead of the ->. With that, the query above may be written as

```
SELECT id, t.id
FROM "deepbench",
UNNEST (a1, t1) UNNEST (t1.a2, t)
WHERE t.id = 956;
```

Figure 12A:
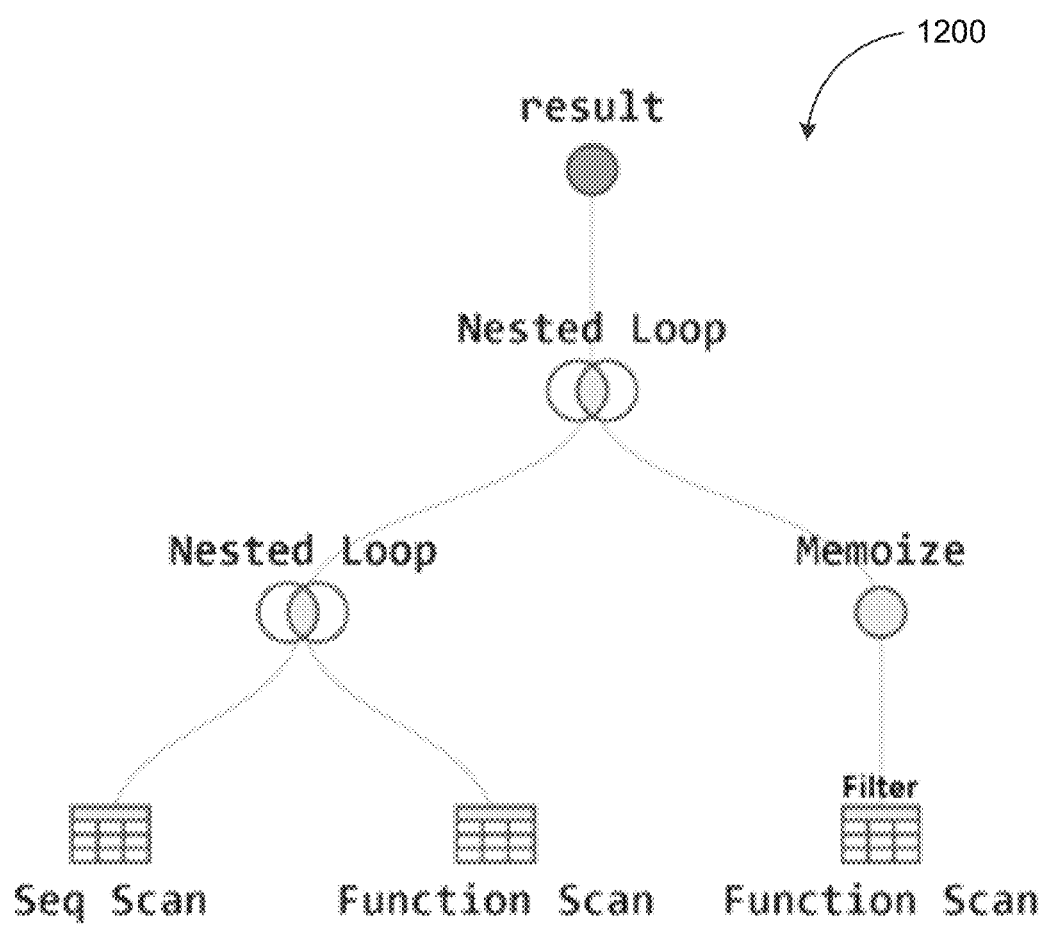
FIG. 12A depicts a schematic diagram illustrating an example of an execution plan for a query with sequential UNNEST operations, in accordance with some example embodiments.

FIG. 12A depicts a schematic diagram illustrating an example of an execution plan 1200 for the aforementioned query with sequential UNNEST operations (Postgres EXPLAIN). The example of the execution plan 1200 shown in FIG. 12A includes a sequential scan of the complete collection that is followed by two nested loops with a filter applied to the result set in a second loop.

Figure 12B:
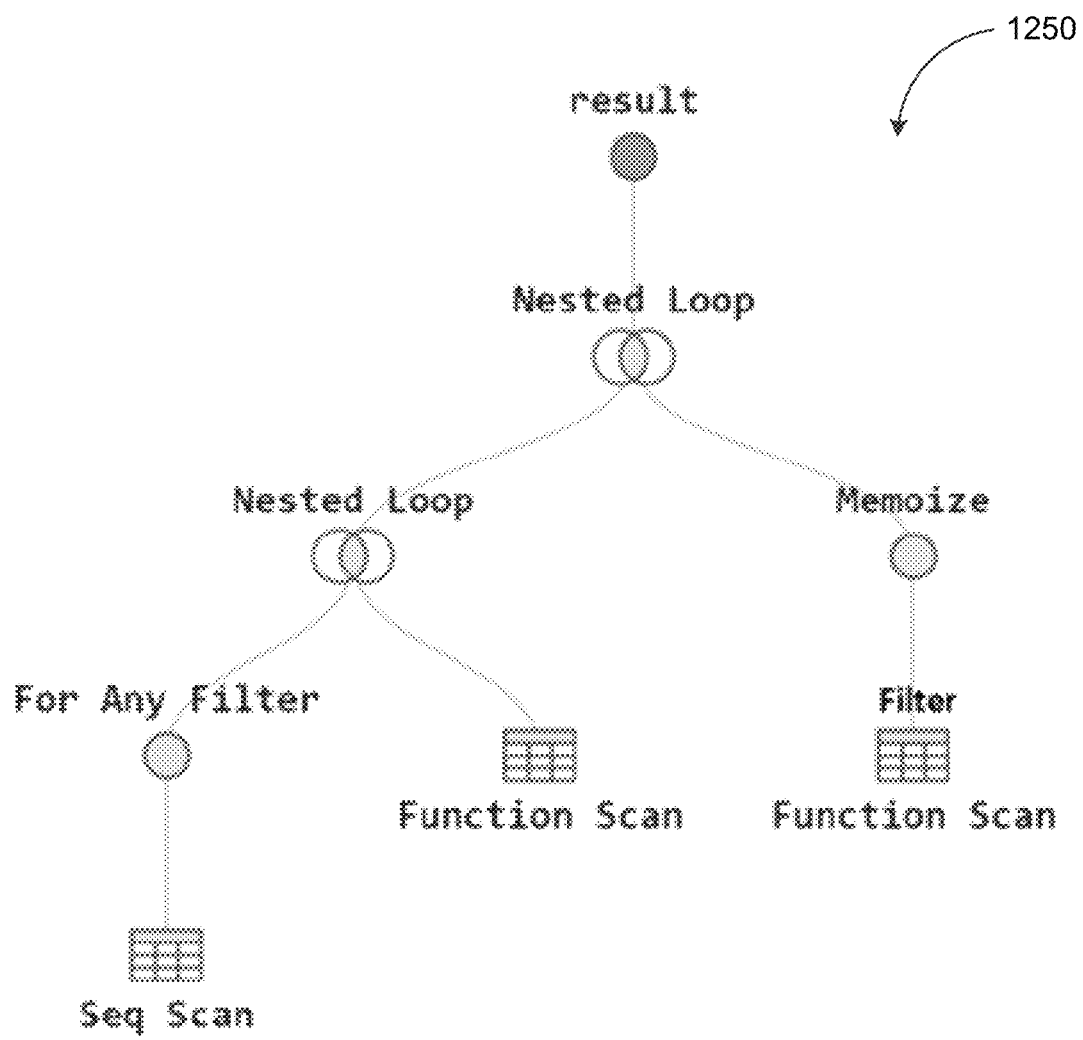
FIG. 12B depicts a schematic diagram illustrating another example of an execution plan for a query with sequential UNNEST operations, in accordance with some example embodiments.

In some example embodiments, FIG. 12B depicts a schematic diagram illustrating another example of an execution plan 1250 including an improvement to the UNNEST operations included in the execution plan 1200 shown in FIG. 12A. This improvement may include pre-filtering the underlying data, for example, by iterating through the arrays to be unnested and check if any of the element satisfies the predicate in the WHERE clause. In subsequent discussions, the UNNEST operator on a vector at position s with the alias t may be denoted as $u_s^t$ while a composition of such operations may be denoted by $\otimes$ for Cartesian UNNEST operations and $\odot$ for sequential UNNEST operations. Accordingly, query

```
SELECT id, t.id
FROM "deepbench",
UNNEST (b1, t0)
UNNEST (a1, t1),
``` may be rewritten to $\mathcal{U} | \sigma_{(t \cdot k=0)} | \pi_{id, t \cdot id}$, where the UNNEST operation $\mathcal{U}$ may be expressed as $\mathcal{U} := \mu_{b1}^{t0} \otimes (\mu_{a1}^{t1} \odot \mu_{t1 \cdot a2}^{t})$.

For the filter improvement, the notation $\Phi$, which may be used to represent any predicate, is defined as $\Phi(\chi, \psi)(R) := \{t: t \in R, x \mapsto \vec{v}, \exists e \in \vec{v}, \phi(e)\}$, such that at least one of the element in the array $\vec{v}$ pointed by x satisfies the predicate $\psi$. Queries with the following structure are then analyzed with the foregoing notation.

```
SELECT x_1, ... , x_s FROM C
UNNEST (a_0^0, t_0^0) UNNEST (t_0^0. a_1^0, t_1^0) ...
UNNEST (a_0^1, t_0^1) UNNEST (t_0^1. a_1^1, t_1^1) ...
...
UNNEST (a_0^n, t_0^n) UNNEST (t_n^n. a_0^n, t_1^n) ...
WHERE P
AND f_0^0(t_0^0) AND f_1^0(t_1^0) ...
AND f_0^1(t_0^1) AND f_1^1(t_1^1) ...
...
AND f_0^n(t_0^n) AND f_1^n(t_1^n) ... ;
``` wherein $\mathcal{P}$ is a predicate independent of any UNNEST alias and each function $f_j^i$ is dependent only upon the corresponding UNNEST alias $t_j^i$. Any other identifiers are unrelated to other UNNEST operations. Each UNNEST alias $t_j^i$ is assumed to have a related function $f_j^i$. In the event such function does not exist in a query, then $f_j^i := \text{TRUE}$. This optimization can be easily generalized even if it does not cover all possible cases.

The main query may be written as $\mathcal{U} | \sigma_{\mathcal{P} \wedge \mathcal{A}} | \pi_{x_1, \ldots, x_s}$, wherein $$\mathcal{U} := \otimes_{j=0}^{n} \left( \odot_{k=0}^{n_j} \mu_{k-1, a_k}^{t_k} \right),$$

$$_c\mathcal{A} := \wedge_{j=1}^{n} {_c}\mathcal{A}_j \left( t_1^j, \ldots, t_{n_j}^j \right), \text{ and}$$

$$_c\mathcal{A}_j := \wedge_{k=1}^{n_j} f_k^j \left( t_k^j \right).$$

For the improvement, the predicate $\mathcal{F} := \wedge_{j=1}^{n} \mathcal{F}_0^j$ may be constructed recursively for each $\mathcal{F}_0^j$ as follows $$\begin{cases} \mathcal{F}_n^j := f(t_n^j) \wedge \Phi(t_{n+1}^j, \mathcal{F}_n^j) & n = 0, \ldots, n_j \\ \Phi(t_{n+1}^j, \mathcal{F}_{nj+1}^j) := \text{TRUE} \end{cases}$$

The recursively reconstructed predicate $\mathcal{F}$ may allow the execution plan to be rewritten as $\sigma_{\mathcal{P} \wedge \mathcal{F}} | \mathcal{U} | \sigma_{\mathcal{P} \wedge \mathcal{A}} | \pi_{x_1, \ldots, x_s}$, which shows the necessary for any predicate to reduce the number of entries before the loop.

Figure 13:
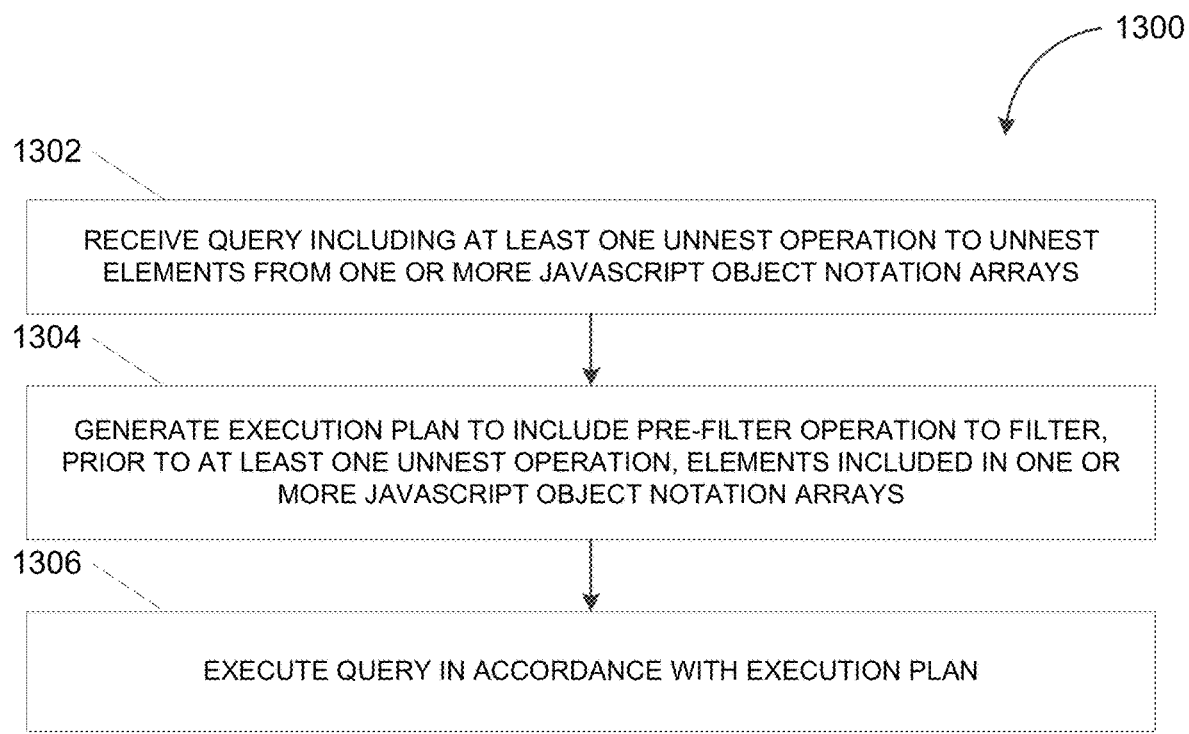
FIG. 13 depicts a flowchart illustrating an example of a process for unnesting a JavaScript Object Notation (JSON) array, in accordance with some example embodiments.

FIG. 13 depicts a flowchart illustrating an example of a process 1300 for unnesting a JavaScript Object Notation (JSON) array, in accordance with some example embodiments. Referring to FIGS. 1 and 13, the process 1300 may be performed by a query processing engine 150 communicatively coupled, for example, with the one or more document stores 130 over the network 140.

At 1302, the query processing engine 150 may receive a query including at least one UNNEST operation to unnest elements from one or more JavaScript Object Notation (JSON) arrays. For example, the query processing engine 150 may receive, from the one or more client devices 125, a query for execution at the one or more document stores 130. As noted, the one or more document stores 130 may be configured to store data (e.g., documents) in a JavaScript Object Notation (JSON) format. For example, the one or more document stores 130 may include JSON document stores (e.g., Couchbase, MongoDB, OrientDB, and/or the like) and/or relational databases with JSON extension (e.g., PostgreSQL, SAP HANA). Accordingly, the query received from the one or more client devices 125 may operate on JSON documents that includes one or more nested objects and arrays. For instance, the query may include at least one UNNEST operation, which may ingest a JSON array and return a table with a row for each element in the array.

At 1304, the query processing engine 150 may generate an execution plan to include a pre-filter operation to filter, prior to the at least one UNNEST operation, the elements included in the one or more JavaScript Object Notation (JSON) arrays. In some example embodiments, the query processing engine 150 may respond to receiving the query from the one or more client devices 125 by generating a corresponding execution plan. The execution plan may be generated to include a pre-filter operation prior to the performance of the UNNEST operations included in the query. The pre-filter operation may pre-filter the JSON arrays that are to be unnested by at least iterating through the arrays to be unnested and check if any of the element satisfies the predicate in the WHERE clause.

At 1306, the query processing engine 150 may execute the query in accordance with the execution plan. For example, the query processing engine 150 may execute the query in accordance with the execution plan 1250 shown in FIG. 12B. As shown in FIG. 12B, the execution plan 1250 may include a pre-filtering operation (e.g., a for any filter) to iterate through the arrays to be unnested and determine if any of the element satisfy the predicate in the WHERE clause. The inclusion of the pre-filtering operation may improve the runtime and computational efficiency of the UNNEST operation by at least reducing the number of elements being unnested. In the example shown in FIG. 12B, the pre-filtering operation may reduce the number of entries before the nested loop.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

Example 2: The system of Example 1, wherein the at least one unnest operation unnests the plurality of elements by at least generating a table in which each row of the table is populated by an element from the plurality of elements.

Example 3: The system of any of Examples 1 to 2, wherein each element of the plurality of elements is associated with a path that includes one or more other elements of the plurality of elements that are traversed in order to reach the element.

Example 4: The system of any of Examples 1 to 3, wherein the at least one unnest operation includes a first unnest operation performed on a first array and a second unnest operation performed on a second array.

Example 5: The system of Example 4, wherein the first unnest operation and the second unnest operation form a sequential unnest operation based at least on the first unnest operation and the second unnest operation sharing a common sub-path with a common root element, and wherein the sequential unnest operation includes concatenating a first result of the first unnest operation and a second result of the second unnest operation.

Example 6: The system of any of Examples 4 to 5, wherein the first unnest operation and the second unnest operation form a Cartesian unnest operation based at least on the first unnest operation and the second unnest operation not sharing a common root element, and wherein the Cartesian unnest operation includes generating a Cartesian product of a first result of the first unnest operation and a second result of the second unnest operation.

Example 7: The system of any of Examples 1 to 6, wherein the at least one unnest operation is performed without indexing the plurality of elements from the one or more JSON arrays.

Example 8: The system of any of Examples 1 to 7, wherein the executing of the query includes performing the pre-filter operation by at least iterating through the plurality of elements from the one or more JSON arrays to identify one or more elements satisfying a predicate included in a where clause of the query.

Example 9: The system of any of Examples 1 to 8, wherein the pre-filter operation is performed to reduce the quantity of elements to be unnested when performing the at least one unnest operation.

Example 10: The system of any of Examples 1 to 9, wherein the plurality of data includes custom data and/or existing data associated with the one or more document stores.

Example 11: The system of any of Example 1 to 10, wherein the query is executed at a document store storing one or more JSON documents including the one or more JSON arrays.

Example 12: The system of Example 11, wherein the document store is a JSON document store and/or a relational database with a JSON extension.

Example 13: A computer-implemented method, comprising: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

Example 14: The method of Example 13, wherein the at least one unnest operation unnests the plurality of elements by at least generating a table in which each row of the table is populated by an element from the plurality of elements, and wherein each element of the plurality of elements is associated with a path that includes one or more other elements of the plurality of elements that are traversed in order to reach the element.

Example 15: The method of any of Examples 13 to 14, wherein the at least one unnest operation includes a first unnest operation performed on a first array and a second unnest operation performed on a second array.

Example 16: The method of Example 15, wherein the first unnest operation and the second unnest operation form a sequential unnest operation based at least on the first unnest operation and the second unnest operation sharing a common sub-path with a common root element, and wherein the sequential unnest operation includes concatenating a first result of the first unnest operation and a second result of the second unnest operation.

Example 17: The method of any of Examples 15 to 16, wherein the first unnest operation and the second unnest operation form a Cartesian unnest operation based at least on the first unnest operation and the second unnest operation not sharing a common root element, and wherein the Cartesian unnest operation includes generating a Cartesian product of a first result of the first unnest operation and a second result of the second unnest operation.

Example 18: The method of any of Examples 13 to 17, wherein the at least one unnest operation is performed without indexing the plurality of elements from the one or more JSON arrays.

Example 19: The method of any of Examples 13 to 18, wherein the executing of the query includes performing the pre-filter operation by at least iterating through the plurality of elements from the one or more JSON arrays to identify one or more elements satisfying a predicate included in a where clause of the query, and wherein the pre-filter operation is performed to reduce the quantity of elements to be unnested when performing the at least one unnest operation.

Example 20: A non-transitory computer readable medium storing instructions, which when executed by at least one data processor, result in operations comprising: receiving a query including at least one unnest operation to unnest a plurality of elements from one or more JavaScript Object Notation (JSON) arrays; generating an execution plan to include a pre-filter operation to filter, prior to the at least one unnest operation, the plurality of elements included in the one or more JSON arrays; and executing the query in accordance with the execution plan.

Figure 14:
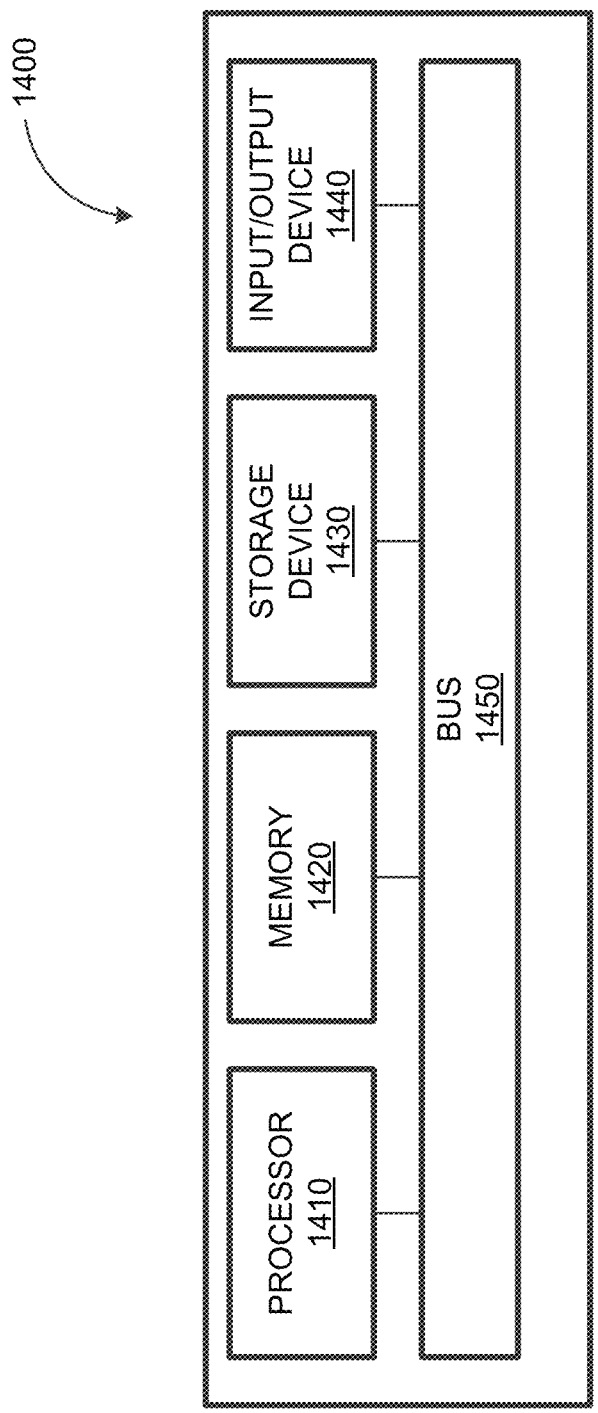
FIG. 14 depicts a block diagram illustrating an example of a computing system, in accordance with some example embodiments.

FIG. 14 depicts a block diagram illustrating an example of a computing system 1400 consistent with implementations of the current subject matter. Referring to FIGS. 1-14, the computing system 1400 may implement the benchmarking initializer 110, the benchmarking client 120, the query processing engine 150, and/or any components therein.

As shown in FIG. 14, the computing system 1400 can include a processor 1410, a memory 1420, a storage device 1430, and input/output device 1440. The processor 1410, the memory 1420, the storage device 1430, and the input/output device 1440 can be interconnected via a system bus 1450. The processor 1410 is capable of processing instructions for execution within the computing system 1400. Such executed instructions can implement one or more components of, for example, the benchmarking initializer 110, the benchmarking client 120, the query processing engine 150, and/or the like. In some implementations of the current subject matter, the processor 1410 can be a single-threaded processor. Alternately, the processor 1410 can be a multi-threaded processor. The processor 1410 is capable of processing instructions stored in the memory 1420 and/or on the storage device 1430 to display graphical information for a user interface provided via the input/output device 1440.

The memory 1420 is a computer readable medium such as volatile or non-volatile that stores information within the computing system 1400. The memory 1420 can store data structures representing configuration object databases, for example. The storage device 1430 is capable of providing persistent storage for the computing system 1400. The storage device 1430 can be a floppy disk device, a hard disk device, an optical disk device, or a tape device, or other suitable persistent storage means. The input/output device 1440 provides input/output operations for the computing system 1400. In some implementations of the current subject matter, the input/output device 1440 includes a keyboard and/or pointing device. In various implementations, the input/output device 1440 includes a display unit for displaying graphical user interfaces.

According to some implementations of the current subject matter, the input/output device 1440 can provide input/output operations for a network device. For example, the input/output device 1440 can include Ethernet ports or other networking ports to communicate with one or more wired and/or wireless networks (e.g., a local area network (LAN), a wide area network (WAN), the Internet).

In some implementations of the current subject matter, the computing system 1400 can be used to execute various interactive computer software applications that can be used for organization, analysis and/or storage of data in various (e.g., tabular) format (e.g., Microsoft Excel®, and/or any other type of software). Alternatively, the computing system 1400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1440. The user interface can be generated and presented to a user by the computing system 1400 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving a query including at least one unnest operation to unnest a plurality of elements from one or more JavaScript Object Notation (JSON) arrays;
   generating an execution plan to include a pre-filter operation to filter the plurality of elements included in the one or more JSON arrays before the at least one unnest operation to unnest the plurality of element from one or more JSON arrays; and
   executing the query in accordance with the execution plan.

2. The system of claim 1, wherein the at least one unnest operation unnests the plurality of elements by at least generating a table in which each row of the table is populated by an element from the plurality of elements.

3. The system of claim 1, wherein each element of the plurality of elements is associated with a path that includes one or more other elements of the plurality of elements that are traversed in order to reach the element.

4. The system of claim 1, wherein the at least one unnest operation includes a first unnest operation performed on a first array and a second unnest operation performed on a second array.

5. The system of claim 4, wherein the first unnest operation and the second unnest operation form a sequential unnest operation based at least on the first unnest operation and the second unnest operation sharing a common sub-path with a common root element, and wherein the sequential unnest operation includes concatenating a first result of the first unnest operation and a second result of the second unnest operation.

6. The system of claim 4, wherein the first unnest operation and the second unnest operation form a Cartesian unnest operation based at least on the first unnest operation and the second unnest operation not sharing a common root element, and wherein the Cartesian unnest operation includes generating a Cartesian product of a first result of the first unnest operation and a second result of the second unnest operation.

7. The system of claim 1, wherein the at least one unnest operation is performed without indexing the plurality of elements from the one or more JSON arrays.

8. The system of claim 1, wherein the executing of the query includes performing the pre-filter operation by at least iterating through the plurality of elements from the one or more JSON arrays to identify one or more elements satisfying a predicate included in a where clause of the query.

9. The system of claim 1, wherein the pre-filter operation is performed to reduce a quantity of elements to be unnested when performing the at least one unnest operation.

10. The system of claim 1, wherein the plurality of data includes custom data and/or existing data associated with one or more document stores.

11. The system of claim 1, wherein the query is executed at a document store storing one or more JSON documents including the one or more JSON arrays.

12. The system of claim 11, wherein the document store is a JSON document store and/or a relational database with a JSON extension.

13. A computer-implemented method, comprising:
    receiving a query including at least one unnest operation to unnest a plurality of elements from one or more JavaScript Object Notation (JSON) arrays;
    generating an execution plan to include a pre-filter operation to filter the plurality of elements included in the one or more JSON arrays before the at least one unnest operation to unnest the plurality of element from one or more JSON arrays; and
    executing the query in accordance with the execution plan.

14. The method of claim 13, wherein the at least one unnest operation unnests the plurality of elements by at least generating a table in which each row of the table is populated by an element from the plurality of elements, and wherein each element of the plurality of elements is associated with a path that includes one or more other elements of the plurality of elements that are traversed in order to reach the element.

15. The method of claim 13, wherein the at least one unnest operation includes a first unnest operation performed on a first array and a second unnest operation performed on a second array.

16. The method of claim 15, wherein the first unnest operation and the second unnest operation form a sequential unnest operation based at least on the first unnest operation and the second unnest operation sharing a common sub-path with a common root element, and wherein the sequential unnest operation includes concatenating a first result of the first unnest operation and a second result of the second unnest operation.

17. The method of claim 15, wherein the first unnest operation and the second unnest operation form a Cartesian unnest operation based at least on the first unnest operation and the second unnest operation not sharing a common root element, and wherein the Cartesian unnest operation includes generating a Cartesian product of a first result of the first unnest operation and a second result of the second unnest operation.

18. The method of claim 13, wherein the at least one unnest operation is performed without indexing the plurality of elements from the one or more JSON arrays.

19. The method of claim 13, wherein the executing of the query includes performing the pre-filter operation by at least iterating through the plurality of elements from the one or more JSON arrays to identify one or more elements satisfying a predicate included in a where clause of the query, and wherein the pre-filter operation is performed to reduce a quantity of elements to be unnested when performing the at least one unnest operation.

20. A non-transitory computer readable medium storing instructions, which when executed by at least one data processor, result in operations comprising:
    receiving a query including at least one unnest operation to unnest a plurality of elements from one or more JavaScript Object Notation (JSON) arrays;
    generating an execution plan to include a pre-filter operation to filter the plurality of elements included in the one or more JSON arrays before the at least one unnest operation to unnest the plurality of element from one or more JSON arrays; and
    executing the query in accordance with the execution plan.

\* \* \* \* \*